(12) United States Patent
Lin et al.

(10) Patent No.: US 12,256,439 B2
(45) Date of Patent: Mar. 18, 2025

(54) METHOD AND APPARATUS FOR RANDOM ACCESS PROCEDURE

(71) Applicant: Telefonaktiebolaget LM Ericsson (publ), Stockholm (SE)

(72) Inventors: Zhipeng Lin, Nanjing (CN); Jan Christoffersson, Luleå (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 317 days.

(21) Appl. No.: 17/625,377

(22) PCT Filed: Jun. 30, 2020

(86) PCT No.: PCT/CN2020/099388
§ 371 (c)(1),
(2) Date: Jan. 7, 2022

(87) PCT Pub. No.: WO2021/004337
PCT Pub. Date: Jan. 14, 2021

(65) Prior Publication Data
US 2022/0256610 A1    Aug. 11, 2022

(30) Foreign Application Priority Data

Jul. 9, 2019  (WO) ................ PCT/CN2019/095313

(51) Int. Cl.
*H04W 74/08*    (2024.01)
*H04W 74/00*    (2009.01)
*H04W 74/0833*  (2024.01)

(52) U.S. Cl.
CPC ..... *H04W 74/0833* (2013.01); *H04W 74/004* (2013.01)

(58) Field of Classification Search
CPC ................ H04W 74/0833; H04W 74/004
See application file for complete search history.

(56) References Cited

U.S. PATENT DOCUMENTS

| 2018/0368189 A1 | 12/2018 | Narasimha et al. |
| 2019/0150190 A1 | 5/2019 | Kim et al. |

(Continued)

FOREIGN PATENT DOCUMENTS

| CN | 101507348 A | 8/2009 |
| CN | 108391314 A | 8/2018 |

(Continued)

OTHER PUBLICATIONS

Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.

(Continued)

*Primary Examiner* — John D Blanton
(74) *Attorney, Agent, or Firm* — Withrow & Terranova, PLLC

(57) ABSTRACT

Embodiments of the present disclosure provide methods and apparatuses for random access procedure. A method at a user equipment (UE) comprises selecting a synchronization signal and physical broadcast channel block (SSB) with a signal measured metric satisfying a criterion. The method further comprises transmitting a first message including a random access channel (RACH) preamble on a RACH occasion and data on an uplink shared channel (USCH) to a base station. The RACH preamble and the RACH occasion are selected based on a mapping of the SSB to the RACH preamble and the RACH occasion. The method further comprises receiving a second message from the base station as a response to the first message.

19 Claims, 16 Drawing Sheets

(56) References Cited

U.S. PATENT DOCUMENTS

| | | | | |
|---|---|---|---|---|
| 2020/0100297 | A1* | 3/2020 | Agiwal | H04W 52/365 |
| 2020/0389924 | A1* | 12/2020 | Lei | H04L 1/0003 |
| 2021/0298086 | A1 | 9/2021 | Jiang et al. | |
| 2022/0104275 | A1* | 3/2022 | Bao | H04L 5/0091 |
| 2022/0210675 | A1* | 6/2022 | Cui | H04W 24/08 |
| 2022/0210751 | A1* | 6/2022 | Lee | H04W 52/50 |

FOREIGN PATENT DOCUMENTS

| | | |
|---|---|---|
| CN | 109076556 A | 12/2018 |
| CN | 109729580 A | 5/2019 |
| WO | 2018203724 A1 | 11/2018 |
| WO | 2019050316 A1 | 3/2019 |
| WO | 2020225009 A2 | 11/2020 |
| WO | 2020249548 A1 | 12/2020 |

OTHER PUBLICATIONS

Author Unknown, "Technical Specification Group Radio Access Network; NR; Medium Access Control (MAC) protocol specification (Release 15)," Technical Specification 38.321, Version 15.5.0, Mar. 2019, 3GPP Organizational Partners, 78 pages.

Ericsson, "R1-1907181: Procedure for Two-step RACH," 3GPP TSG-RAN WG1 Meeting #97, May 13-17, 2019, Reno, Nevada, 8 pages.

ZTE Corporation, et al., "RP-182894: New work item: 2-step RACH for NR," 3GPP TSG RAN Meeting #82, Dec. 10-13, 2018, Sorrento, Italy, 5 pages.

International Search Report and Written Opinion for International Patent Application No. PCT/CN2020/099388, mailed Oct. 10, 2020, 13 pages.

Qualcomm Incorporated, "R5-165411: Addition of New eMTC Test Case—7.1.2.3a Correct selection of RACH parameters/ Preamble selected by MAC itself/ Contention based random access procedure/ Enhanced coverage," 3GPP TSG-RAN WG5 Meeting #72, Aug. 22-26, 2016, Gotenburg, Sweden, 7 pages.

VIVO, "R2-1905655: Discussion on the MsgA resource selection," 3GPP TSG-RAN WG2 Meeting #106, Reno, Nevada, May 13-17, 2019, 7 pages.

First Office Action for Chinese Patent Application No. 202080049868. 4, mailed Mar. 30, 2023, 15 pages.

Partial Supplementary European Search Report for European Patent Application No. 20837047.8, mailed Jun. 7, 2023, 20 pages.

Examination Report for Indian Patent Application No. 202247006071, mailed Jul. 12, 2022, 6 pages.

* cited by examiner

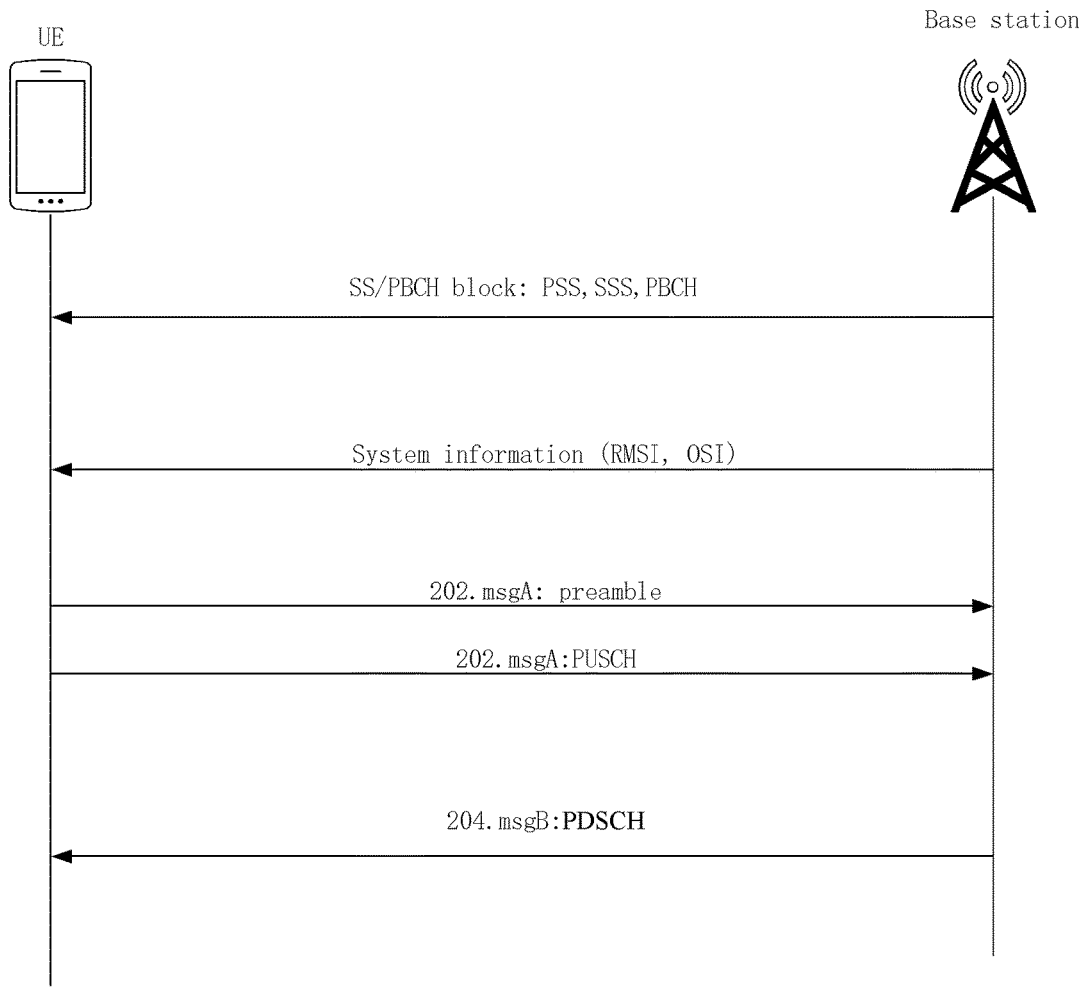

FIG. 2

Transmitting a first message including a random access channel (RACH) preamble on a RACH occasion and data on an uplink shared channel (USCH) to a base station, wherein the data includes information of at least one synchronization signal and physical broadcast channel block (SSB) with a signal measured metric satisfying a criteria Receiving a second message as a response to the first message

322
Selecting a synchronization signal and physical broadcast channel block (SSB) with a signal measured metric satisfying a criterion 324
Transmitting a first message including a random access channel (RACH) preamble on a RACH occasion and data on an uplink shared channel (USCH) to a base station. The RACH preamble and the RACH occasion are selected based on a mapping of the SSB to the RACH preamble and the RACH occasion 326
Receiving a second message from the base station as a response to the first message

402
Receiving a first message including a random access channel (RACH) preamble on a RACH occasion and data on an uplink shared channel (USCH) from a user equipment (UE), wherein the data includes information of at least one synchronization signal and physical broadcast channel block (SSB) with a signal measured metric satisfying a criteria 404
Transmitting a second message as a response to the first message

FIG. 4

METHOD AND APPARATUS FOR RANDOM ACCESS PROCEDURE

This application is a 35 U.S.C. § 371 national phase filing of International Application No. PCT/CN2020/099388, filed Jun. 30, 2020, which claims the benefit of International Application No. PCT/CN2019/095313, filed Jul. 9, 2019, the disclosures of which are incorporated herein by reference in their entireties.

TECHNICAL FIELD

The non-limiting and exemplary embodiments of the present disclosure generally relate to the technical field of communications, and specifically to method and apparatus for random access procedure.

BACKGROUND

This section introduces aspects that may facilitate a better understanding of the disclosure. Accordingly, the statements of this section are to be read in this light and are not to be understood as admissions about what is in the prior art or what is not in the prior art.

In a wireless communication system such as NR (new radio), a random access procedure such as 4-step random access procedure is needed for a UE to get access to the communication system. Before initiating random access procedure, UE needs to go through an initial synchronization process. For example, the UE needs to detect a synchronization signal (SS) such as Primary Synchronization Signals (PSSs) and Secondary Synchronization Signals (SSSs), etc. Then the UE decodes broadcasted system information. The next step is known as the random access procedure.

In a 4-step random access procedure as shown in FIG. 1, the UE transmits a PRACH (physical random access channel) preamble (msg1) in an uplink at step 102. The base station such as next generation NodeB (gNodeB or gNB) replies with a RAR (Random Access Response, msg2) at step 104. The RAR may carry following information: temporary C-RNTI (cell radio network temporary identity); Timing Advance Value; and Uplink Grant Resource. The UE then transmits a RRC (radio resource control) connection request message (msg3) on a physical uplink shared channel (PUSCH) at step 106. The RRC connection request message may contain following information: UE identity and connection establishment cause. The UE transmits PUSCH (msg3) after receiving a timing advance command in the RAR, allowing PUSCH to be received with a timing accuracy within the cyclic prefix. Without this timing advance, a very large CP (Cyclic-Prefix) would be needed in order to be able to demodulate and detect PUSCH, unless the system is applied in a cell with very small distance between UE and the base station. The base station responds with contention resolution message (msg4) to UE at step 108. Since NR will also support larger cells with a need for providing a timing advance to the UE, the 4-step random access procedure is needed for random access procedure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A 2-step RACH (random access channel) work item has been approved in 3rd generation partnership project (3GPP) meeting. The 2-step random access procedure as shown in FIG. 2 can complete initial access in only two steps. As shown in FIG. 2, at step 202, UE sends a message A (msgA) including PRACH preamble on a PRACH occasion together with higher layer data such as RRC connection request possibly with some small payload on PUSCH. At step 204, the base station such as gNB sends a message B (msgB) such as RAR including one or more of UE identifier assignment, timing advance information, and contention resolution message, etc.

In NR, the time and frequency resource on which a PRACH preamble is transmitted is defined as a PRACH occasion. The PRACH occasion may be also called RACH occasion, or RA occasion, or in short RO. And the RO used for the transmission of the PRACH preambles in 2-step random access procedure is called 2-step RO, while the RO used for the transmission of the PRACH preambles in 4-step random access procedure is called 4-step RO.

NR release (Rel) 15 of 3GPP supports one-to-one, one-to-many, and many-to-one association between Synchronization Signal Block and PRACH occasions. In addition, there may be a mapping between SSB (synchronization signal and physical broadcast channel block) and PRACH preambles. In NR, the SSB may include PSS, SSS and PBCH (Physical Broadcast Channel). When UE selects an available SSB beam, a PRACH occasion associated with the SSB and a PRACH preamble in the set of one or more PRACH preambles mapped to this SSB will be selected for the random access, then when the gNB detects the PRACH preamble, the selected SSB beam for the UE is known according to the association so that selected beam can be used for transmitting signals to or receiving signals from the UE.

In recent NR RAN2 meeting, below agreements have been made to support the msgB multiplexing messages of multiple UEs, which is transmitted in a single PDSCH (Physical Downlink Shared Channel).

For CCCH (Common Control Channel), for success or fallback RAR, MsgB can multiplex messages for multiple UEs. For further study (FFS) if we can multiplex SRB (Signalling Radio Bearer) RRC messages of multiple UEs.

MsgB containing the success RAR shall not be multiplexed with the legacy 4-step RACH RAR in the same MAC (Medium Access Control) PDU (Protocol Data Unit).

In the 2-step random access procedure, no agreements have yet been met regarding SSB selection and reporting.

Although the combining of messages for multiple UEs in a same msgB is supported in 2-step random access procedure, there are some concerns in the 2-step random access procedure. For example, one issue is that when multiple SSBs are mapped to one RO, and if the msgB transmissions for these UEs correspond to different SSB beams, nowhere to know which SSB beam should be used for the combined transmission of the msgB. Another issue is it is unsettled which RNTIs (radio network temporary identities) and/or MCS (modulation coding scheme) should be used for this kind of msgB transmissions and monitoring needs to be determined.

To overcome or mitigate at least one of the above mentioned problems or other problems or provide a useful solution, some embodiments of the present disclosure propose methods on how to group the UEs in a same msgB PDSCH transmission. Some embodiments provide a solution for indication of SSB by the UE. Some embodiments provide a solution for determining the beam to be used for the combined msgB transmission. Some embodiments provide a solution for determining the RNTI to be used for the combined msgB transmission/monitoring. Some embodiments provide a solution for determining the MCS to be used for the combined msgB transmissions.

In a first aspect of the disclosure, there is provided a method at a user equipment (UE). The method comprises transmitting a first message including a random access channel (RACH) preamble on a RACH occasion and data on an uplink shared channel (USCH) to a base station, wherein the data includes information of at least one synchronization signal and physical broadcast channel block (SSB) with a signal measured metric satisfying a criterion. The method further comprises receiving a second message as a response to the first message.

In an embodiment, at least one SSB with the signal measured metric satisfying the criterion includes a subset or set of all SSBs with the signal measured metric satisfying the criterion.

In an embodiment, the at least one SSB with the signal measured metric satisfying the criterion includes the SSBs that are associated with the RACH occasion.

In an embodiment, the at least one SSB with the signal measured metric satisfying the criterion includes the SSBs in a set of SSBs with the signal measured metric satisfying the criterion except the SSB indicated by the RACH preamble and the RACH occasion.

In an embodiment, the at least one SSB is indicated by using a list sorted by the signal measured metric.

In an embodiment, the at least one SSB is indicated by using a bitmap.

In an embodiment, the RACH preamble and the RACH occasion are selected based on a mapping of the SSB to the RACH preamble and the RACH occasion.

In an embodiment, the RACH preamble and the RACH occasion are selected based on a predefined rule.

In an embodiment, the RACH is a physical random access channel (PRACH), the USCH is a physical uplink shared channel (PUSCH) and the signal measured metric is reference signal received power (RSRP), or reference signal received quality (RSRQ), or signal-to-interference-plus-noise ratio (SINR) measured based on a downlink signal.

In an embodiment, the criterion is the signal measured metric larger than or no less than a threshold.

In an embodiment, the second message can multiplex respective response to respective first message of the UE and at least one other UE.

In an embodiment, UEs having a same determined MCS are multiplexed in the second message; and/or UEs having a certain common SSB with a signal measured metric satisfying the criterion are multiplexed in the second message; and/or UEs transmitting RACH preambles mapped to a same SSB are multiplexed in the second message; and/or UEs having a same downlink preferred beam are multiplexed in the second message.

In an embodiment, a beam for the second message is one of a common downlink beam of the UE and the at least one other UE; a beam covering at least one of the UE's preferred beam and the at least one other UE's preferred beam; a preferred beam of a UE with a higher priority between the UE and the at least one other UE; and a beam randomly selected from the UE's preferred beam and the at least one other UE's preferred beam.

In an embodiment, a radio network temporary identifier (RNTI) for the second message is one of a common RNTI of the UE and the at least one other UE; a UE specific RNTI of a UE with a higher priority between the UE and the at least one other UE; a UE specific RNTI randomly selected from the UE's UE specific RNTI and the at least one other UE's UE specific RNTI; and a UE specific RNTI determined based on a measurement on uplink signals from the UE and the at least one other UE or a measurement by the UE and the at least one other UE on downlink signals.

In an embodiment, the common RNTI is computed based on a same RACH occasion when the at least one other UE and the UE having the first message transmitted on the same RACH occasion, or the common RNTI is a group RNTI defined for the UE and the at least one other UE; or the common RNTI is indicated in respective first message from the UE and the at least one other UE.

In an embodiment, when the RNTI for the second message is the UE specific RNTI, a system frame number is included in downlink control information to indicate whether a corresponding second message is for the UE. In an embodiment, the UE specific RNTI is a random access RNTI (RA-RNTI).

In an embodiment, a modulation coding scheme (MCS) for the second message is one of MCS corresponding to a lowest signal/link quality between the UE's signal/link quality and the at least one other UE's signal/link quality; MCS corresponding to a signal/link quality of a UE with a higher priority between the UE and the at least one other UE; and MCS with the lowest coding rate and/or the lowest modulation order selected from a group of MCSs determined for the UE and the at least one other UE.

In a second aspect of the disclosure, there is provided a method at a base station. The method comprises receiving a first message including a random access channel (RACH) preamble on a RACH occasion and data on an uplink shared channel (USCH) from a user equipment (UE), wherein the data includes information of at least one synchronization signal and physical broadcast channel block (SSB) with a signal measured metric satisfying a criterion. The method further comprises transmitting a second message as a response to the first message.

In a third aspect of the disclosure, there is provided a method at a base station. The method comprises receiving a first message including a random access channel (RACH) preamble on a RACH occasion and data on an uplink shared channel (USCH) from a user equipment (UE). The method further comprises transmitting a second message as respective response to respective first message of the UE and at least one other UE. The base station determines a beam for the second message as one of a common downlink beam of the UE and the at least one other UE; a beam covering at least one of the UE's preferred beam and the at least one other UE's preferred beam; a preferred beam of a UE with a higher priority between the UE and the at least one other UE; and a beam randomly selected from the UE's preferred beam and the at least one other UE's preferred beam.

In a fourth aspect of the disclosure, there is provided a method at a base station. The method comprises receiving a first message including a random access channel (RACH) preamble on a RACH occasion and data on an uplink shared channel (USCH) from a UE. The method further comprises transmitting a second message as respective response to respective first message of the UE and at least one other UE. The base station determines a radio network temporary identifier (RNTI) for the second message is one of a common RNTI of the UE and the at least one other UE; a UE specific RNTI of a UE with a higher priority between the UE and the at least one other UE; a UE specific RNTI randomly selected from the UE's UE specific RNTI and the at least one other UE's UE specific RNTI; and a UE specific RNTI determined based on a measurement on uplink signals from the UE and the at least one other UE or a measurement by the UE and the at least one other UE on downlink signals.

In a fifth aspect of the disclosure, there is provided a method at a base station. The method comprises receiving a first message including a random access channel (RACH) preamble on a RACH occasion and data on an uplink shared channel (USCH) from a user equipment (UE). The method further comprises transmitting a second message as respective response to respective first message of the UE and at least one other UE. The base station determines a modulation coding scheme (MCS) for the second message as one of MCS corresponding to a lowest signal/link quality between the UE's signal/link quality and the at least one other UE's signal/link quality; MCS corresponding to a signal/link quality of a UE with a higher priority between the UE and the at least one other UE; and MCS with the lowest coding rate and/or the lowest modulation order selected from a group of MCSs determined for the UE and the at least one other UE.

In an embodiment, the data includes information of at least one synchronization signal and physical broadcast channel block (SSB) with a signal measured metric satisfying a criterion.

In a sixth aspect of the disclosure, there is provided a method at a user equipment (UE). The method comprises selecting a synchronization signal and physical broadcast channel block (SSB) with a signal measured metric satisfying a criterion. The method further comprises transmitting a first message including a random access channel (RACH) preamble on a RACH occasion and data on an uplink shared channel (USCH) to a base station. The RACH preamble and the RACH occasion are selected based on a mapping of the SSB to the RACH preamble and the RACH occasion. The method further comprises receiving a second message from the base station as a response to the first message.

In an embodiment, the data comprises information indicating at least one SSB with the signal measured metric satisfying the criterion.

In an embodiment, the at least one SSB indicated by the first message includes one or more SSBs that are associated with the RACH occasion.

In an embodiment, the at least one SSB indicated by the first message includes the SSBs in a set of SSBs with the signal measured metric satisfying the criterion except the SSB indicated by the RACH preamble and the RACH occasion.

In an embodiment, the at least one SSB is indicated by a list sorted by the signal measured metric or a bitmap.

In an embodiment, the RACH is a physical random access channel (PRACH), the USCH is a physical uplink shared channel (PUSCH) and the signal measured metric is reference signal received power (RSRP), or reference signal received quality (RSRQ), or signal-to-interference-plus-noise ratio (SINR) measured based on a downlink signal.

In an embodiment, the criterion is that the signal measured metric larger than or no less than a threshold.

In an embodiment, the second message can multiplex respective response to respective first message of the UE and at least one other UE.

In an embodiment, the UE and the at least one other UE have a same determined MCS are multiplexed in the second message; have a certain common SSB with a signal measured metric satisfying the criterion are multiplexed in the second message; transmit RACH preambles mapped to a same SSB are multiplexed in the second message; and/or have a same downlink preferred beam are multiplexed in the second message.

In an embodiment, a beam for the second message is one of a common downlink beam of the UE and the at least one other UE; a beam covering at least one of the UE's preferred beam and the at least one other UE's preferred beam; a preferred beam of a UE with a higher priority between the UE and the at least one other UE; and a beam randomly selected from the UE's preferred beam and the at least one other UE's preferred beam.

In an embodiment, a radio network temporary identifier (RNTI) for the second message is one of a common RNTI of the UE and the at least one other UE; a UE-specific RNTI with a higher priority between the UE and the at least one other UE; a UE-specific RNTI randomly selected from the UE's UE specific RNTI and the at least one other UE's UE specific RNTI; and a UE-specific RNTI determined based on a measurement on uplink signals from the UE and the at least one other UE or a measurement by the UE and the at least one other UE on downlink signals.

In an embodiment, the common RNTI is computed based on a same RACH occasion when the at least one other UE and the UE having the first message transmitted on the same RACH occasion, or the common RNTI is a group RNTI defined for the UE and the at least one other UE; or the common RNTI is indicated in respective first message from the UE and the at least one other UE.

In a seventh aspect of the disclosure, there is provided a method at a base station. The method comprises receiving a first message including a random access channel (RACH) preamble on a RACH occasion and data on an uplink shared channel (USCH) from a user equipment (UE). The RACH preamble or the RACH occasion indicates an SSB selected by the UE based on a mapping of the SSB to the RACH preamble and the RACH occasion. The selected SSB has a signal measured metric satisfying a criterion. The method further comprises transmitting a second message as a response to the first message to the UE.

In an embodiment, the data comprises information indicating at least one SSB with the signal measured metric satisfying the criterion, the method further comprises: selecting a downlink beam for transmitting the second message to the UE based on the indication in the data.

In an eighth aspect of the disclosure, there is provided an apparatus at a user equipment (UE). The apparatus comprises a processor; and a memory coupled to the processor, said memory containing instructions executable by said processor, whereby said apparatus is operative to select a synchronization signal and physical broadcast channel block (SSB) with a signal measured metric satisfying a criterion. Said apparatus is further operative to transmit a first message including a random access channel (RACH) preamble on a RACH occasion and data on an uplink shared channel (USCH) to a base station. The RACH preamble and the RACH occasion are selected based on a mapping of the SSB to the RACH preamble and the RACH occasion. Said apparatus is further operative to receive a second message as a response to the first message from the base station.

In a ninth aspect of the disclosure, there is provided an apparatus at a base station. The apparatus comprises a processor; and a memory coupled to the processor, said memory containing instructions executable by said processor, whereby said apparatus is operative to receive a first message including a random access channel (RACH) preamble on a RACH occasion and data on an uplink shared channel (USCH) from a user equipment (UE), wherein the RACH preamble or the RACH occasion indicates an SSB selected by the UE based on a mapping of the SSB to the RACH preamble and the RACH occasion; wherein the selected SSB has a signal measured metric satisfying a criterion. Said apparatus is further operative to transmit a second message as a response to the first message to the UE.

In another aspect of the disclosure, there is provided an apparatus at a user equipment (UE). The apparatus comprises a processor; and a memory coupled to the processor, said memory containing instructions executable by said processor, whereby said apparatus is operative to transmit a first message including a random access channel (RACH) preamble on a RACH occasion and data on an uplink shared channel (USCH) to a base station, wherein the data includes information of at least one synchronization signal and physical broadcast channel block (SSB) with a signal measured metric satisfying a criterion. Said apparatus is further operative to receive a second message as a response to the first message.

In another aspect of the disclosure, there is provided an apparatus at a base station. The base station comprises a processor; and a memory coupled to the processor, said memory containing instructions executable by said processor, whereby said apparatus is operative to receive a first message including a random access channel (RACH) preamble on a RACH occasion and data on an uplink shared channel (USCH) from a user equipment (UE), wherein the data includes information of at least one synchronization signal and physical broadcast channel block (SSB) with a signal measured metric satisfying a criterion. Said apparatus is further operative to transmit a second message as a response to the first message.

In another aspect of the disclosure, there is provided an apparatus at a base station. The base station comprises a processor; and a memory coupled to the processor, said memory containing instructions executable by said processor, whereby said apparatus is operative to receive a first message including a random access channel (RACH) preamble on a RACH occasion and data on an uplink shared channel (USCH) from a user equipment (UE). Said apparatus is further operative to transmit a second message as respective response to respective first message of the UE and at least one other UE. The base station determines a beam for the second message as one of a common downlink beam of the UE and the at least one other UE; a beam covering at least one of the UE's preferred beam and the at least one other UE's preferred beam; a preferred beam of a UE with a higher priority between the UE and the at least one other UE; and a beam randomly selected from the UE's preferred beam and the at least one other UE's preferred beam.

In another aspect of the disclosure, there is provided an apparatus at a base station. The base station comprises a processor; and a memory coupled to the processor, said memory containing instructions executable by said processor, whereby said apparatus is operative to receive a first message including a random access channel (RACH) preamble on a RACH occasion and data on an uplink shared channel (USCH) from a user equipment (UE). Said apparatus is further operative to transmit a second message as respective response to respective first message of the UE and at least one other UE. The base station determines a radio network temporary identifier (RNTI) for the second message is one of a common RNTI of the UE and the at least one other UE; a UE specific RNTI of a UE with a higher priority between the UE and the at least one other UE; a UE specific RNTI randomly selected from the UE's UE specific RNTI and the at least one other UE's UE specific RNTI; and a UE specific RNTI determined based on a measurement on uplink signals from the UE and the at least one other UE or a measurement by the UE and the at least one other UE on downlink signals.

In another aspect of the disclosure, there is provided an apparatus at a base station. The base station comprises a processor; and a memory coupled to the processor, said memory containing instructions executable by said processor, whereby said apparatus is operative to receive a first message including a random access channel (RACH) preamble on a RACH occasion and data on an uplink shared channel (USCH) from a user equipment (UE). Said apparatus is further operative to transmit a second message as respective response to respective first message of the UE and at least one other UE. The base station determines a modulation coding scheme (MCS) for the second message as one of MCS corresponding to a lowest signal/link quality between the UE's signal/link quality and the at least one other UE's signal/link quality; MCS corresponding to a signal/link quality of a UE with a higher priority between the UE and the at least one other UE; and MCS with the lowest coding rate and/or the lowest modulation order selected from a group of MCSs determined for the UE and the at least one other UE.

In another aspect of the disclosure, there is provided a UE. The UE comprises a transmission module and a reception module. The transmission module is configured to transmit a first message including a random access channel (RACH) preamble on a RACH occasion and data on an uplink shared channel (USCH) to a base station, wherein the data includes information of at least one synchronization signal and physical broadcast channel block (SSB) with a signal measured metric satisfying a criterion. The reception module is configured to receive a second message as a response to the first message.

In another aspect of the disclosure, there is provided a base station. The base station comprises a reception module and a transmission module. The reception module is configured to a first message including a random access channel (RACH) preamble on a RACH occasion and data on an uplink shared channel (USCH) from a user equipment (UE), wherein the data includes information of at least one synchronization signal and physical broadcast channel block (SSB) with a signal measured metric satisfying a criterion. The transmission module is configured to transmit a second message as a response to the first message.

In another aspect of the disclosure, there is provided a base station. The base station comprises a reception module and a transmission module. The reception module is configured to a first message including a random access channel (RACH) preamble on a RACH occasion and data on an uplink shared channel (USCH) from a user equipment (UE). The transmission module is configured to transmit a second message as respective response to respective first message of the UE and at least one other UE. In an embodiment, the based station may determine a beam for the second message as one of a common downlink beam of the UE and the at least one other UE; a beam covering at least one of the UE's preferred beam and the at least one other UE's preferred beam; a preferred beam of a UE with a higher priority between the UE and the at least one other UE; and a beam randomly selected from the UE's preferred beam and the at least one other UE's preferred beam.

In another aspect of the disclosure, there is provided a base station according to an embodiment of the disclosure. The base station comprises a reception module and a transmission module. The reception module is configured to a first message including a random access channel (RACH) preamble on a RACH occasion and data on an uplink shared channel (USCH) from a user equipment (UE). The transmission module is configured to transmit a second message as respective response to respective first message of the UE and at least one other UE. In an embodiment, the based station may determine a radio network temporary identifier (RNTI) for the second message as one of a common RNTI of the UE and the at least one other UE; a UE specific RNTI of a UE with a higher priority between the UE and the at least one other UE; a UE specific RNTI randomly selected from the UE's UE specific RNTI and the at least one other UE's UE specific RNTI; and a UE specific RNTI determined based on a measurement on uplink signals from the UE and the at least one other UE or a measurement by the UE and the at least one other UE on downlink signals.

In another aspect of the disclosure, there is provided a base station according to an embodiment of the disclosure. The base station comprises a reception module and a transmission module. The reception module is configured to receiving a first message including a random access channel (RACH) preamble on a RACH occasion and data on an uplink shared channel (USCH) from a user equipment (UE). The transmission module is configured to transmit a second message as respective response to respective first message of the UE and at least one other UE. In an embodiment, the based station may determine a modulation coding scheme (MCS) for the second message as one of MCS corresponding to a lowest signal/link quality between the UE's signal/link quality and the at least one other UE's signal/link quality; MCS corresponding to a signal/link quality of a UE with a higher priority between the UE and the at least one other UE; and MCS with the lowest coding rate and/or the lowest modulation order selected from a group of MCSs determined for the UE and the at least one other UE.

In another aspect of the disclosure, there is provided a user equipment (UE). The UE comprises a selecting module, a transmitting module and a receiving module. The selecting module is configured to select a synchronization signal and physical broadcast channel block (SSB) with a signal measured metric satisfying a criterion. The transmitting module is configured to transmit a first message including a random access channel (RACH) preamble on a RACH occasion and data on an uplink shared channel (USCH) to a base station. The RACH preamble and the RACH occasion are selected based on a mapping of the SSB to the RACH preamble and the RACH occasion. The receiving module is configured to receive a second message from the base station as a response to the first message In another aspect of the disclosure, there is provided a base station. The base station comprises a receiving module and a transmitting module. The receiving module is configured to receive a first message including a random access channel (RACH) preamble on a RACH occasion and data on an uplink shared channel (USCH) from a user equipment (UE). The RACH preamble or the RACH occasion indicates an SSB selected by the UE based on a mapping of the SSB to the RACH preamble and the RACH occasion. The selected SSB has a signal measured metric satisfying a criterion. The a transmitting module is configured to transmit a second message as a response to the first message to the UE.

In another aspect of the disclosure, there is provided a computer program product, comprising instructions which, when executed on at least one processor, cause the at least one processor to carry out the method according to any of the above first to seventh aspects.

In another aspect of the disclosure, there is provided a computer-readable storage medium storing instructions which when executed by at least one processor, cause the at least one processor to carry out the method according to any of the above first to seventh aspects.

According to another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station is to carry out the method according to any of the above second to fifth and seventh aspects.

According to another aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry is configured to carry out the method according to any of the above second to fifth and seventh aspects.

According to a twentieth aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The terminal device is configured to carry out the method according to any of the above first and sixth aspects.

According to another aspect of the disclosure, there is provided a communication system including a host computer comprising processing circuitry configured to provide user data and a communication interface configured to forward user data to a cellular network for transmission to a terminal device. The terminal device comprises a radio interface and processing circuitry. The processing circuitry of the terminal device is configured to carry out the method according to any of the above first and sixth aspects.

According to another of the disclosure, there is provided a method implemented in a communication system including a host computer, a base station and a terminal device. The method comprises, at the host computer, receiving user data transmitted to the base station from the terminal device. The terminal device is configured to carry out the method according to any of the above first and sixth aspects.

According to another aspect of the disclosure, there is provided a communication system including a host computer comprising a communication interface configured to receive user data originating from a transmission from a terminal device to a base station. The terminal device comprises a radio interface and processing circuitry. The processing circuitry of the terminal device is configured to carry out the method according to any of the above first and sixth aspects.

According to another aspect of the disclosure, there is provided a method implemented in a communication system including a host computer, a base station and a terminal device. The method comprises, at the host computer, receiving, from the base station, user data originating from a transmission which the base station has received from the terminal device. The base station is configured to carry out the method according to any of the above second to fifth and seventh aspects.

According to another aspect of the disclosure, there is provided a communication system including a host computer comprising a communication interface configured to receive user data originating from a transmission from a terminal device to a base station. The base station comprises a radio interface and processing circuitry. The base station's processing circuitry is configured to carry out the method according to any of the above second to fifth and seventh aspects.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2 shows a flowchart of a 2-step random access procedure;

FIG. 3a shows a flowchart of a method according to an embodiment of the present disclosure;

FIG. 3b shows a flowchart of a method according to an embodiment of the present disclosure;

FIG. 4 shows a flowchart of a method according to another embodiment of the present disclosure;

DETAILED DESCRIPTION

Figure 1:
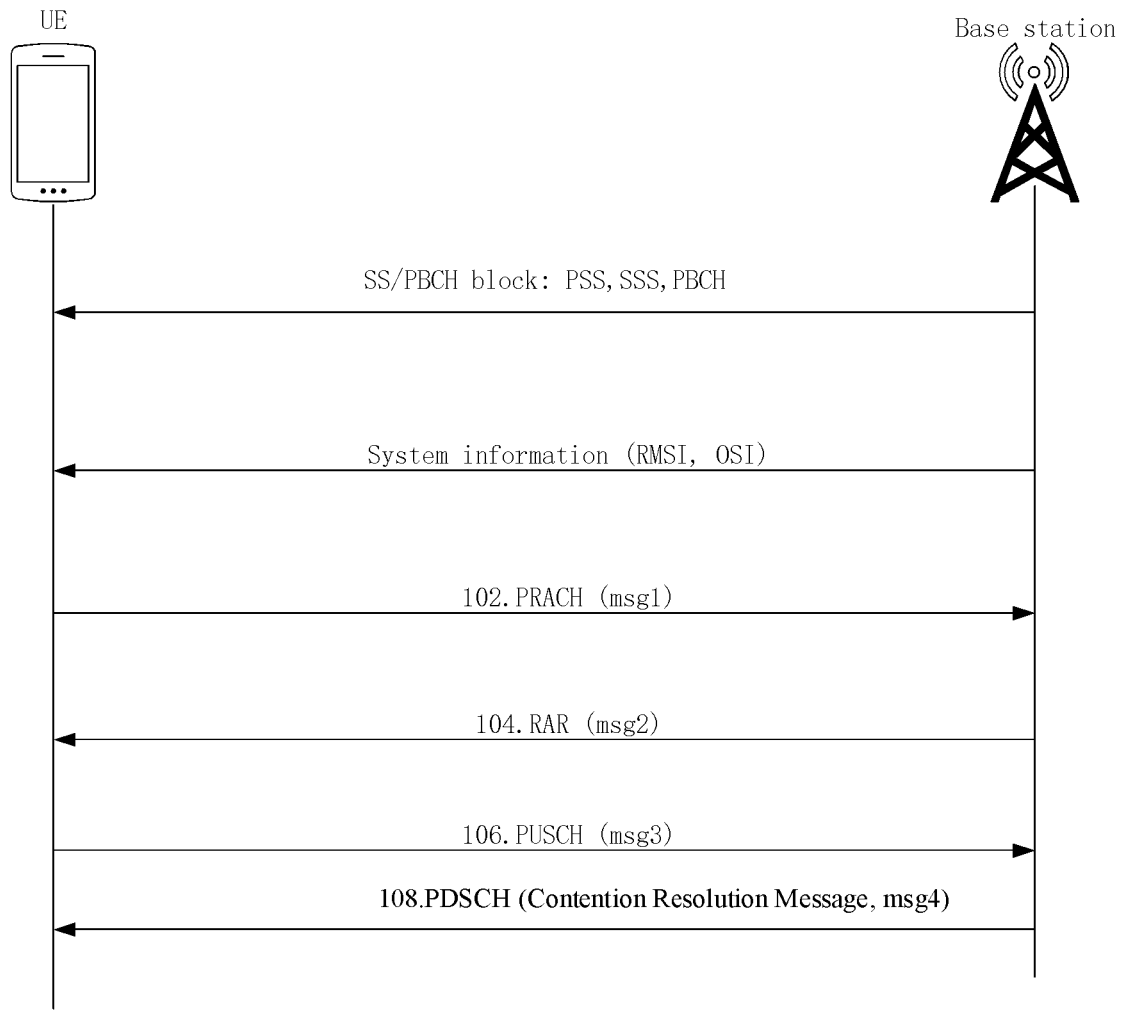
FIG. 1 shows a flowchart of a 4-step random access procedure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as the first generation (1G), 2G, 2.5G, 2.75G, 3G, 4G, 4.5G, 5G communication protocols, and/or any other communication standards either currently known or to be developed in the future. In the following description, the terms "network" and "system" can be used interchangeably. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

The term "base station" refers to an access network device in a communication network via which a terminal device accesses to the network and receives services therefrom. For example, the base station (BS) may comprise, but not limited to, an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (TOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device to a terminal device, and an uplink, UL, transmission refers to a transmission in an opposite direction.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that though the embodiments are mainly described in the context of 2-step random access procedure and NR, they are not limited to this but can be applied to any suitable random access procedure and network.

FIG. 3a shows a flowchart of a method 300 according to an embodiment of the present disclosure, which may be performed by an apparatus implemented in or at or communicatively coupled to a UE or any other entity having similar functionality. As such, the UE may provide means for accomplishing various parts of the method 300 as well as means for accomplishing other processes in conjunction with other components.

At block 302, the UE transmits a first message including a random access channel (RACH) preamble on a RACH occasion and data on an uplink shared channel (USCH) to a base station. As described above, before initiating random access procedure, the UE may need to go through an initial synchronization process. For example, the UE detects a synchronization signal (SS) such as Primary Synchronization Signals (PSSs) and Secondary Synchronization Signals (SSSs). Then the UE decodes the broadcasted system information such as PBCH, RMSI (Remaining Minimum System Information), OSI (Other System Information), etc.

The first message may be referred to as msgA herein. In an embodiment, the first message may be a layer 1 message. The data on the USCH may include any suitable information. For example, the data on the USCH may include higher layer data such as RRC connection request possibly with some small payload on PUSCH. In an embodiment, the channel structure of msgA may be PRACH preamble and PUSCH carrying payload. In an embodiment, the SSB may correspond to SS/PBCH block in NR. In an embodiment, the first message may also include the equivalent contents of msg3 of 4-step random access procedure. In an embodiment, the first message may reuse the 3GPP Rel 15 NR PUSCH including Rel-15 DMRS (Demodulation Reference Signal) for transmission of payload of msgA.

The RACH preamble may be any suitable preamble used for random access procedure. For example, the RACH preamble may reuse the 3GPP Release 15 NR PRACH Preambles design. In an embodiment, there may be a mapping between the PRACH preamble and the time-frequency resource of PUSCH in msgA+ DMRS. In an embodiment, there may be any suitable supported modulation coding scheme(s) (MCS(s)) and time-frequency resource size(s) of PUSCH in msgA. In an embodiment, there may be any suitable power control of PUSCH of msgA. In an embodiment, UCI (uplink control information) may be included in msgA.

Since the reporting of SSB in the 4-step random access procedure is only explicitly done by SSB to RO and preamble mapping, it is only possible to indicate one single SSB by the preamble transmission. This makes it difficult for the base station such as gNB to know if a UE indicating a beam corresponding to e.g. SSB1 would be able to receive a msgB transmitted on a beam corresponding to e.g. SSB2. An improved SSB reporting by the UE can be performed by reporting more than one beam or SSB in the msgA transmission. There may be many methods to report more than one SSB in the 2-step random access procedure.

In an embodiment, the data may include information of at least one synchronization signal and physical broadcast channel block (SSB) with a signal measured metric satisfying a criterion. The signal measured metric may be any suitable signal measured metric measured based on downlink signals. In an embodiment, the signal measured metric may be reference signal received power (RSRP), or reference signal received quality (RSRQ), or signal-to-interference-plus-noise ratio (SINR) measured based on a downlink signal. The reference signal can be any suitable reference signal such as synchronization signal reference signal, etc. In an embodiment, the signal may be a layer 1 signal. For example, the data may include information of at least one SSB with a synchronization signal RSRP (SS-RSRP) above rsrp-ThresholdSSB. The rsrp-ThresholdSSB is described in 3GPP TS 38.321 V15.5.0, the disclosure of which is incorporated by reference herein in their entirety.

In an embodiment, the criterion may be a threshold and the signal measured metric satisfying the criterion may include the signal measured metric larger than or no less than the threshold.

In an embodiment, at least one SSB with the signal measured metric satisfying the criterion may include a subset or set of all SSBs with the signal measured metric satisfying the criterion. The set of all SSBs with the signal measured metric satisfying the criterion may be determined by measuring signal measured metric of a candidate set of SSBs and comparing the signal measured metric to a corresponding criterion. The criterion may be predefined or indicated in at least one of system information and dedicated higher layer control signaling. For example, the selected preamble and/or RO may indicate the best beam. The data on the USCH may indicate a subset of all SSBs with SS-RSRP above rsrp-ThresholdSSB. The set of all SSBs with SS-RSRP above rsrp-ThresholdSSB may be determined by measuring the power of a candidate set of SSBs and comparing the measured power to rsrp-ThresholdSSB. In another example, a different threshold than rsrp-ThresholdSSB may be used, and this threshold may be predefined or indicated in at least one of system information and dedicated higher layer control signaling.

In an embodiment, the at least one SSB with the signal measured metric satisfying the criterion includes the SSBs that are associated with the RACH occasion. For example, the at least one SSB corresponds to the SSBs that are associated with the RACH occasion. An advantage of this embodiment is that a fixed set of SSBs are associated with each RACH occasion, and since an RNTI can be used to identify at least the RACH occasion, the signaling only needs to identify the fixed set of SSBs associated with the RO, which can reduce signaling overhead compared to when the at least one SSB are from multiple ROs. For example, each SSB can be identified by one bit in the signaling, and if the signal measured metric of a SSB satisfies the criterion, the corresponding bit may be set to 1, otherwise the corresponding bit may be set to 0. In some embodiments, the association between ROs and the preambles in ROs may be performed according to subclause 8.1 of 3GPP TS 38.213 V15.6.0, the disclosure of which is incorporated by reference herein in their entirety.

In an embodiment, the at least one SSB with the signal measured metric satisfying the criterion includes the SSBs in a set of SSBs with the signal measured metric satisfying the criterion except the SSB indicated by the RACH preamble and the RACH occasion. For example, the at least one SSB can be the SSBs in the set of SSBs with SS-RSRP above rsrp-ThresholdSSB except the SSB indicated by the preamble and RO.

In an embodiment, the at least one SSB with the signal measured metric satisfying the criterion includes all SSBs in a set of SSBs with the signal measured metric satisfying the criterion. For example, all SSBs in the set of SSBs with SS-RSRP above rsrp-ThresholdSSB are indicated in the PUSCH of msgA. The set of SSBs with SS-RSRP above rsrp-ThresholdSSB may be determined by measuring the power of a candidate set of SSBs and comparing the measured power to rsrp-ThresholdSSB.

In various embodiments, the criterion may be predefined (such as rsrp-ThresholdSSB) or indicated in system information and/or a non-access stratum layer control signaling. When the criterion is indicated in system information and/or a non-access stratum layer control signaling, the criterion may be updated.

In an embodiment, the at least one SSB is indicated by using a list sorted by the signal measured metric. For example, the set of SSBs with SS-RSRP above a received power threshold are indicated in the PUSCH of msgA using a sorted list, for example sorted by the SS-RSRP. The threshold may be rsrp-ThresholdSSB or a different threshold than rsrp-ThresholdSSB. The threshold may be indicated in at least one of system information and dedicated higher layer control signaling. In an embodiment, each element of the sorted list includes respective index of the at least one SSB. For example, each element of the list may include an index of the SSB on which the SS-RSRP was measured. In an embodiment, each element of the sorted list includes an indication of a value of the signal measured metric of the at least one SSB. For example, an element of the list may include an indication of a value of the SS-RSRP measured on the SSB.

In an embodiment, the at least one SSB is indicated by using a bitmap. For example, the set of SSBs with SS-RSRP above a received power threshold are indicated in the PUSCH of msgA using a bitmap. In an embodiment, each bit in the bitmap corresponds to only one SSB and all bits in the bitmap correspond to one RO. In another embodiment, each bit in the bitmap corresponds to only one SSB and all bits in the bitmap corresponds to all SSBs used in the base station. In still another embodiment, 1 bit in the bitmap can be mapped to a subset of the considered SSBs, and all bits in the bitmap are mapped to a completed set of the considered SSBs.

In an embodiment, the RACH preamble and the RACH occasion are selected based on a mapping of the SSB to the RACH preamble and the RACH occasion. For example, a detailed mapping rule is specified in section 8.1 of 3GPP TS 38.213 V15.6.0. The UE will select an SSB with SS-RSRP above rsrp-ThresholdSSB (if such SSB is available). The selected SSB will be indicated to the gNB either by the selected preamble or by the PRACH occasion (RO). This indication will enable the gNB to choose a suitable DL beam for the RAR transmission. The SSB selection and the preamble transmission (and mapping RO to SSB) may be similar to those as specified in subclause 5.1.2 of 3GPP TS 38.321 V15.5.0, the disclosure of which is incorporated by reference herein in their entirety.

In an embodiment, the RACH preamble and the RACH occasion are selected based on a predefined rule. For example, when the set of SSBs with SS-RSRP above a received power threshold are indicated in PUSCH of msgA, the SSB to preamble and RO mapping may be removed. In this case, the RACH preamble and the RACH occasion may be selected based on a predefined rule, which can give more available ROs and preambles for random access indicating a specific SSB. The predefined rule may be random selection rule or any other suitable selection rule.

In an embodiment, the RACH is a physical random access channel (PRACH). In an embodiment, the USCH is a physical uplink shared channel (PUSCH).

At block 304, the UE receives a second message as a response to the first message. The second message such as msgB may include any suitable information such as the equivalent contents of msg2 and msg4 of 4-step random access procedure. The second message may be a layer 1 message. In an embodiment, for the response to a successfully decoded msgA, the msgB should include TA (timing advance) command, contention resolution ID, etc. For the response to a msgA failed to be decoded, the msgB can be a fall-back message, or even a normal RAR(msg2).

In an embodiment, the second message may include one or more of the UE's assigned identifier, timing advance information and contention resolution message.

In an embodiment, the second message can multiplex respective response to respective first message of the UE and at least one other UE. In this case, the second message further includes the respective response to the respective first message of at least one other UE. For example, for CCCH, for success or fallback RAR, MsgB can multiplex messages for multiple UEs and msgB is transmitted in one PDSCH. In another embodiment, MsgB containing the success RAR shall not be multiplexed with the legacy 4-step RACH RAR in the same MAC PDU.

Which UEs can be multiplexed in the second message can be determined in various ways. In an embodiment, UEs having a same determined MCS can be multiplexed in the second message. In an embodiment, UEs having a certain common SSB with a signal measured metric satisfying the criterion can be multiplexed in the second message. In an embodiment, UEs transmitting RACH preambles mapped to a same SSB can be multiplexed in the second message. In an embodiment, UEs having a same downlink preferred beam can be multiplexed in the second message. The UE's preferred beam can be indicated to the base station in various ways. For example, when UE detects a best SSB beam (i.e., the preferred beam), a PRACH preamble in the set of one or more PRACH preambles mapped to this SSB will be selected for the random access, then when the base station such as gNB detects the PRACH preamble, the best SSB beam for this UE is known indirectly so that best beams can be used for transmitting signals to or receiving signals from this UE. In this case, the UE's preferred beam can correspond to the best SSB beam. In other embodiments, the UE's preferred beam can correspond to the SSB beam with the best signal measured metric (such as the highest RSRP, or the best RSRQ, or the biggest SINR) satisfying the criterion.

A beam for the second message may be determined for example by the base station in various ways. In an embodiment, a beam for the second message may be a common downlink beam of the UE and the at least one other UE. For example, the beam for the combined msgB transmission can be a common downlink beam preferred by the UEs, this requires the combination is only used in a group of UEs with at least one same downlink preferred beam. For example, when 64 preambles are allocated, and each RO is mapped by 4 SSBs and 16 preambles are mapped to each SSB, then only the UEs transmitting some of the 16 preambles mapped to one SSB can be combined in the msgB.

In an embodiment, a beam for the second message may be a beam covering at least one of the UE's preferred beam and the at least one other UE's preferred beam. For example, the beam for the combined msgB transmission can be a wide beam covering at least one of the UE's preferred beam and the at least one other UE's preferred beam.

In an embodiment, a beam for the second message may be a preferred beam of a UE with a higher priority between the UE and the at least one other UE. For example, the beam used for the combined msgB transmission can be determined based on the priority of the data of the UEs. For example, the preferred beam for the transmission of the data for UE with higher priority can be used. The priority can be based on the random access type, e.g. 2-step RA is prioritized. The priority can be based on the service type, e.g. the uRLLC (Ultra Reliable Low Latency Communications) UE is prioritized.

In an embodiment, a beam for the second message may be a beam randomly selected from the UE's preferred beam and the at least one other UE's preferred beam. For example, the beam for the second message is randomly selected from the set of beams preferred by the group of UEs with data combined in one msgB PDSCH.

In an embodiment, a beam for the second message may be determined based on a common SSB from the plurality of SSBs reported by the UEs. For example, UEs that have reported a certain common SSB in the sets (one from each UE) of SSBs with SS-RSRP above rsrp-ThresholdSSB are selected to be combined in PDSCH of one msgB.

A radio network temporary identifier (RNTI) for the second message may be determined for example by the base station in various ways. In an embodiment, the RNTI for the second message may be a common RNTI of the UE and the at least one other UE. The common RNTI may be determined in various ways. In an embodiment, the common RNTI is computed based on a same RACH occasion when the at least one other UE and the UE having the first message transmitted on the same RACH occasion. In an embodiment, the common RNTI is a group RNTI defined for the UE and the at least one other UE. In an embodiment, the common RNTI is indicated in respective first message from the UE and the at least one other UE. For example, the RNTI used for the combined msgB transmission is a common RNTI for the group of UEs combined in the msgB transmission. The common RNTI can be obtained one or more of the following methods: the group of UEs are those that have preambles transmitted on the same RACH occasion so that a common random access RNTI (RA-RNTI) or a RA-RNTI related common RNTI can be obtained; separately defined group RNTI is used for the group of UEs combined in one msgB transmission; the common RNTI to be used is indicated in the msgA PUSCH from the UEs.

In an embodiment, the RNTI for the second message may be a UE specific RNTI of a UE with a higher priority between the UE and the at least one other UE. In an embodiment, the RNTI for the second message may be a UE specific RNTI randomly selected from the UE's UE specific RNTI and the at least one other UE's UE specific RNTI. In an embodiment, the RNTI for the second message may be a UE specific RNTI determined based on a measurement on uplink signals from the UE and the at least one other UE or a measurement by the UE and the at least one other UE on downlink signals. In an embodiment, when the RNTI for the second message is the UE specific RNTI, a system frame number is included in downlink control information to indicate whether a corresponding second message is for the UE. For example, the RNTI used for the msgB transmission is still UE specific msgB RNTI, multiple PDCCHs (Physical Downlink Control Channels) may be transmitted to schedule multiple UEs on the same PDSCH. Which RNTI is used for the PDSCH data scrambling can be indicated in the corresponding L1 signaling, and this can be determined with one or more of the following methods: randomly selected; RA type, e.g. 2-step RA UEs can be prioritized; service type, e.g. uRLLC UEs can be prioritized; the measurement on the received signal from the UE or the measurement by the UE on the downlink signals, e.g. the signal strength, the signal quality.

In an embodiment, the UE specific RNTI is a random access RNTI (RA-RNTI). The RA-RNTI may be similar to the RA-RNTI as described in 3GPP TS 38.321 V15.5.0. For example, the RNTI used for the msgB transmission is still UE specific msgB RNTI, multiple PDCCHs may be transmitted to schedule multiple UEs on the same PDSCH. A SFN (system frame number) information can be included in the DCI (downlink control information) to indicate whether a corresponding PDSCH is for the UE. So that the RA-RNTI can be used by more than one UEs with preambles transmitted on different system frames.

In an embodiment, a modulation coding scheme (MCS) for the second message may be determined for example by the base station as one of MCS corresponding to a lowest signal/link quality between the UE's signal/link quality and the at least one other UE's signal/link quality; MCS corresponding to a signal/link quality of a UE with a higher priority between the UE and the at least one other UE; and MCS with the lowest coding rate and/or the lowest modulation order selected from a group of MCSs determined for the UE and the at least one other UE. For example, an MCS is normally determined by the network based on the quality of the UE, there may be various methods for determining one common MCS for the combined msgB transmission which involves a group of UEs. For example, same MCS is required for the combined UEs in the same msgB transmission, and the same MCS (and also the MCS table) can be determined based on the UE with one or more of the following properties: lowest signal/link quality; 2-step RA or 4-step RA; uRLLC service or eMBB service. In an embodiment, the lowest MCS is selected from the group of MCS values determined for the group of UEs. In some embodiments, only the group of UEs with same determined MCS are combined in one msgB transmission, then the same determined MCS is selected.

FIG. 3b shows a flowchart of a method 320 according to another embodiment of the present disclosure, which may be performed by an apparatus implemented in or at or communicatively coupled to a UE or any other entity having similar functionality. As such, the UE may provide means for accomplishing various parts of the method 320 as well as means for accomplishing other processes in conjunction with other components. For some parts which have been described in the above embodiments, detailed description thereof is omitted here for brevity.

At block 322, the UE selects a synchronization signal and physical broadcast channel block (SSB) with a signal measured metric satisfying a criterion.

At block 324, the UE transmits a first message including a random access channel (RACH) preamble on a RACH occasion and data on an uplink shared channel (USCH) to a base station. The RACH preamble and the RACH occasion are selected based on a mapping of the SSB to the RACH preamble and the RACH occasion; and At block 326, the UE receives a second message from the base station as a response to the first message.

In an embodiment, the data comprises information indicating at least one SSB with the signal measured metric satisfying the criterion.

In an embodiment, the at least one SSB indicated by the first message includes one or more SSBs that are associated with the RACH occasion.

In an embodiment, the at least one SSB indicated by the first message includes the SSBs in a set of SSBs with the signal measured metric satisfying the criterion except the SSB indicated by the RACH preamble and the RACH occasion.

In an embodiment, the at least one SSB is indicated by a list sorted by the signal measured metric or a bitmap.

In an embodiment, the RACH is a physical random access channel (PRACH), the USCH is a physical uplink shared channel (PUSCH) and the signal measured metric is reference signal received power (RSRP), or reference signal received quality (RSRQ), or signal-to-interference-plus-noise ratio (SINR) measured based on a downlink signal.

In an embodiment, the criterion is that the signal measured metric larger than or no less than a threshold.

In an embodiment, the second message can multiplex respective response to respective first message of the UE and at least one other UE.

In an embodiment, the UE and the at least one other UE have a same determined MCS are multiplexed in the second message; have a certain common SSB with a signal measured metric satisfying the criterion are multiplexed in the second message; transmit RACH preambles mapped to a same SSB are multiplexed in the second message; and/or have a same downlink preferred beam are multiplexed in the second message.

In an embodiment, a beam for the second message is one of a common downlink beam of the UE and the at least one other UE; a beam covering at least one of the UE's preferred beam and the at least one other UE's preferred beam; a preferred beam of a UE with a higher priority between the UE and the at least one other UE; and a beam randomly selected from the UE's preferred beam and the at least one other UE's preferred beam.

In an embodiment, a radio network temporary identifier (RNTI) for the second message is one of a common RNTI of the UE and the at least one other UE; a UE-specific RNTI with a higher priority between the UE and the at least one other UE; a UE-specific RNTI randomly selected from the UE's UE specific RNTI and the at least one other UE's UE specific RNTI; and a UE-specific RNTI determined based on a measurement on uplink signals from the UE and the at least one other UE or a measurement by the UE and the at least one other UE on downlink signals.

In an embodiment, the common RNTI is computed based on a same RACH occasion when the at least one other UE and the UE having the first message transmitted on the same RACH occasion, or the common RNTI is a group RNTI defined for the UE and the at least one other UE; or the common RNTI is indicated in respective first message from the UE and the at least one other UE.

FIG. 4 shows a flowchart of a method 400 according to an embodiment of the present disclosure, which may be performed by an apparatus implemented in or at or communicatively coupled to a base station or any other entity having similar functionality. As such, the base station may provide means for accomplishing various parts of the method 400 as well as means for accomplishing other processes in conjunction with other components. For some parts which have been described in the above embodiments, detailed description thereof is omitted here for brevity.

At block 402, the base station receives a first message including a random access channel (RACH) preamble on a RACH occasion and data on an uplink shared channel (USCH) from a user equipment (UE), wherein the data includes information of at least one synchronization signal and physical broadcast channel block (SSB) with a signal measured metric satisfying a criterion. For example, the UE can transmit the first message at block 302 of FIG. 3a, then the base station can receive the first message.

At block 404, the base station transmits a second message as a response to the first message. For example, the second message can only include the response to the first message of the UE. In another example, when the second message is used for multiplexing respective response to respective first message of multiple UEs, the second message can further include the respective response to the first message of at least one other UE.

In an embodiment, the base station can multiplex respective response to respective first message of the UE and at least one other UE in the second message as describe above.

In an embodiment, the base station can determine a beam for the second message as describe above. In an embodiment, the base station can determine a radio network temporary identifier (RNTI) for the second message as describe above. In an embodiment, the base station can determine a modulation coding scheme (MCS) for the second message as describe above.

Figure 5:
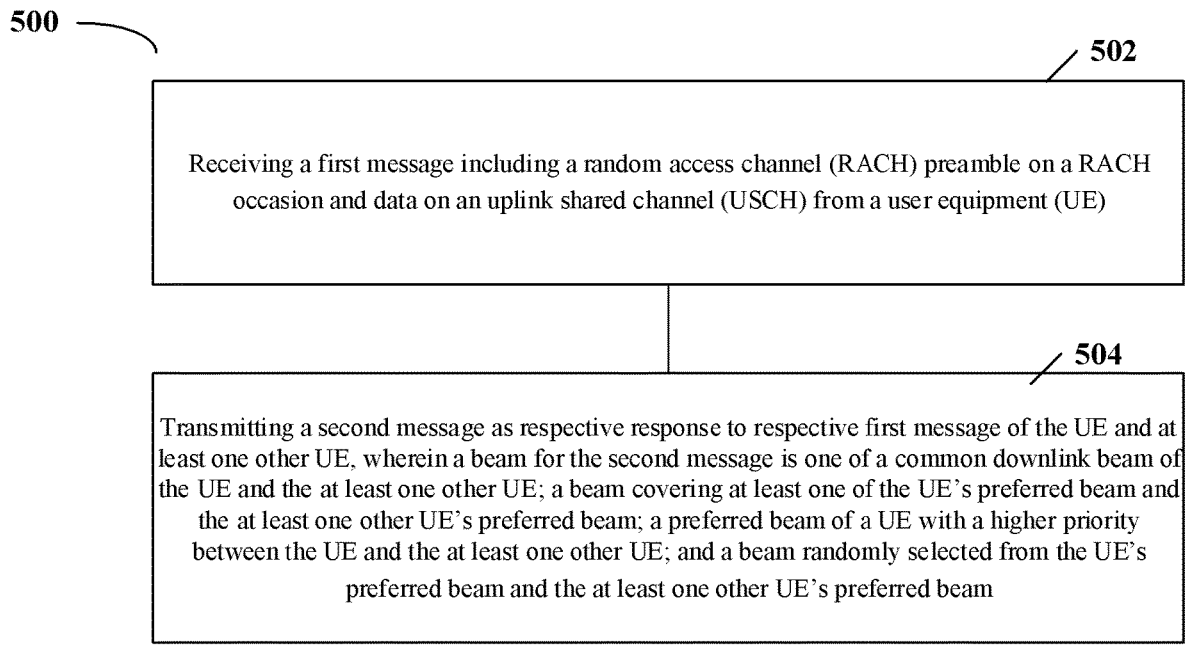
FIG. 5 shows a flowchart of a method according to another embodiment of the present disclosure.

FIG. 5 shows a flowchart of a method 500 according to an embodiment of the present disclosure, which may be performed by an apparatus implemented in or at or communicatively coupled to a base station or any other entity having similar functionality. As such, the base station may provide means for accomplishing various parts of the method 500 as well as means for accomplishing other processes in conjunction with other components. For some parts which have been described in the above embodiments, detailed description thereof is omitted here for brevity.

At block 502, the base station receives a first message including a random access channel (RACH) preamble on a RACH occasion and data on an uplink shared channel (USCH) from a user equipment (UE). For example, when the data includes information of at least one synchronization signal and physical broadcast channel block (SSB) with a signal measured metric satisfying a criterion, the UE can transmits the first message at block 302 of FIG. 3a, then the base station can receive the first message. In another example, the data may not include information of at least one synchronization signal and physical broadcast channel block (SSB) with a signal measured metric satisfying a criterion.

At block 504, the base station transmits a second message as respective response to respective first message of the UE and at least one other UE. In this embodiment, the second message can multiplex respective response to respective first message of the UE and at least one other UE. The base station may determine a beam for the second message as one of a common downlink beam of the UE and the at least one other UE; a beam covering at least one of the UE's preferred beam and the at least one other UE's preferred beam; a preferred beam of a UE with a higher priority between the UE and the at least one other UE; and a beam randomly selected from the UE's preferred beam and the at least one other UE's preferred beam.

In an embodiment, the base station can determine a radio network temporary identifier (RNTI) for the second message as describe above. In an embodiment, the base station can determine a modulation coding scheme (MCS) for the second message as describe above.

Figure 6:
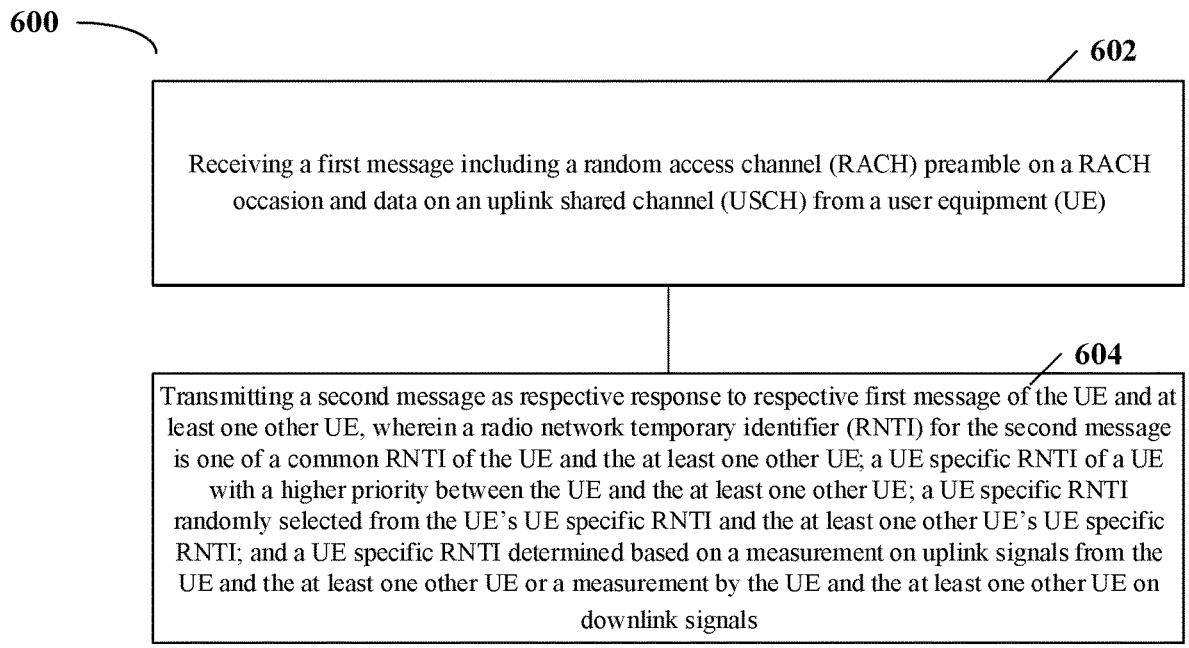
FIG. 6 shows a flowchart of a method according to another embodiment of the present disclosure.

FIG. 6 shows a flowchart of a method 600 according to an embodiment of the present disclosure, which may be performed by an apparatus implemented in or at or communicatively coupled to a base station or any other entity having similar functionality. As such, the base station may provide means for accomplishing various parts of the method 600 as well as means for accomplishing other processes in conjunction with other components. For some parts which have been described in the above embodiments, detailed description thereof is omitted here for brevity.

At block 602, the base station receives a first message including a random access channel (RACH) preamble on a RACH occasion and data on an uplink shared channel (USCH) from a user equipment (UE). For example, when the data includes information of at least one synchronization signal and physical broadcast channel block (SSB) with a signal measured metric satisfying a criterion, the UE can transmits the first message at block 302 of FIG. 3a, then the base station can receive the first message. In another example, the data may not include information of at least one synchronization signal and physical broadcast channel block (SSB) with a signal measured metric satisfying a criterion.

At block 604, the base station transmits a second message as respective response to respective first message of the UE and at least one other UE. In this embodiment, the second message can multiplex respective response to respective first message of the UE and at least one other UE. The base station may determine a radio network temporary identifier (RNTI) for the second message as one of a common RNTI of the UE and the at least one other UE; a UE specific RNTI of a UE with a higher priority between the UE and the at least one other UE; a UE specific RNTI randomly selected from the UE's UE specific RNTI and the at least one other UE's UE specific RNTI; and a UE specific RNTI determined based on a measurement on uplink signals from the UE and the at least one other UE or a measurement by the UE and the at least one other UE on downlink signals.

In an embodiment, the base station can determine a beam for the second message as describe above. In an embodiment, the base station can determine a modulation coding scheme (MCS) for the second message as describe above.

Figure 7A:
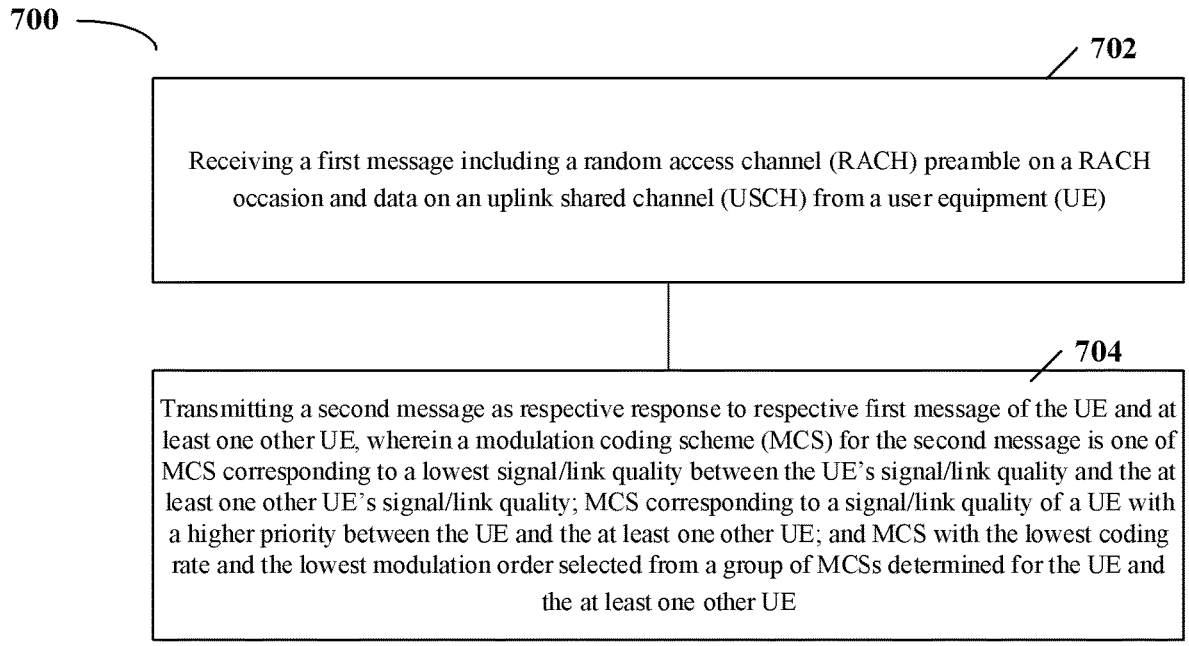
FIG. 7a shows a flowchart of a method according to another embodiment of the present disclosure.

FIG. 7a shows a flowchart of a method 700 according to an embodiment of the present disclosure, which may be performed by an apparatus implemented in or at or communicatively coupled to a base station or any other entity having similar functionality. As such, the base station may provide means for accomplishing various parts of the method 700 as well as means for accomplishing other processes in conjunction with other components. For some parts which have been described in the above embodiments, detailed description thereof is omitted here for brevity.

At block 702, the base station receives a first message including a random access channel (RACH) preamble on a RACH occasion and data on an uplink shared channel (USCH) from a user equipment (UE). For example, when the data includes information of at least one synchronization signal and physical broadcast channel block (SSB) with a signal measured metric satisfying a criterion, the UE can transmits the first message at block 302 of FIG. 3a, then the base station can receive the first message. In another example, the data may not include information of at least one synchronization signal and physical broadcast channel block (SSB) with a signal measured metric satisfying a criterion.

At block 704, the base station transmits a second message as respective response to respective first message of the UE and at least one other UE. In this embodiment, the second message can multiplex respective response to respective first message of the UE and at least one other UE. The base station may determine a modulation coding scheme (MCS) for the second message as one of MCS corresponding to a lowest signal/link quality between the UE's signal/link quality and the at least one other UE's signal/link quality; MCS corresponding to a signal/link quality of a UE with a higher priority between the UE and the at least one other UE; and MCS with the lowest coding rate and/or the lowest modulation order selected from a group of MCSs determined for the UE and the at least one other UE.

In an embodiment, the base station can determine a beam for the second message as describe above. In an embodiment, the base station can determine a radio network temporary identifier (RNTI) for the second message as describe above.

In a first embodiment, there is provided a method for an initial access procedure in a user equipment of indicating the quality of a plurality of reference signals. The method comprise
  a. Identifying a candidate set of reference signals, where each element of the candidate set comprises at least one of a primary synchronization signal, a secondary synchronization signal, and a channel state information reference signal
  b. Measuring the received power of each element in the candidate set,
  c. Selecting a first candidate from among the candidate set of reference signals
  d. Selecting a random access preamble from within a set of random access preambles associated with the first candidate
  e. Transmitting the random access preamble
  f. Determining an indication of a second candidate selected from among the candidate set, wherein the second candidate has a received power greater than a predetermined threshold.
  g. Transmitting the indication of the second candidate in a physical channel.

Figure 7B:
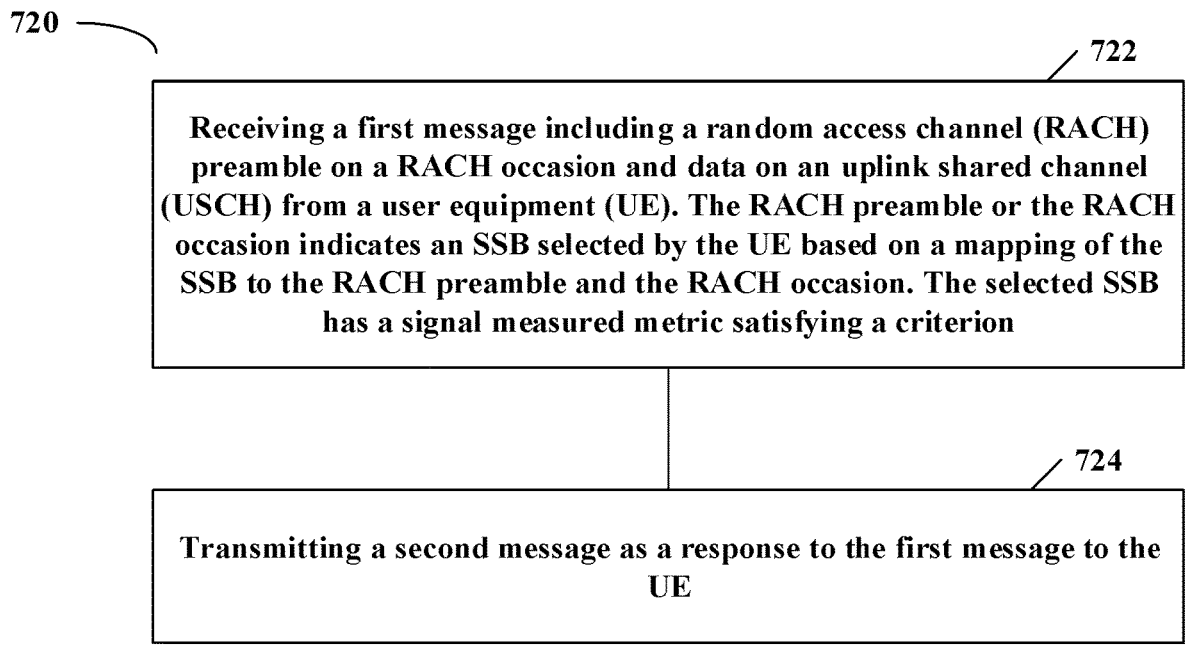
FIG. 7b shows a flowchart of a method according to another embodiment of the present disclosure.

The method of first embodiment, wherein the candidates in the candidate set comprise synchronization signal blocks.
  a. The second candidate is selected from a subset of all SSBs, wherein the subset of SSBs meets one or more of the following requirements:
    associated with the RO
    is the set of SSBs not indicated by the preamble and the RO
    is the set of SSBs with measured metric above a threshold
    1. threshold can be predetermined or signaled from the network via RRC signaling, e.g. system information message and/or UE specific signalling
    2. the measured metric can be, L1-RSRP, L1-RSRQ, L1-SINR or any other metric measured based on downlink signals
  b. all methods in a can be applied to a whole set of SSBs
  c. the second candidate is transmitted in a physical channel
    the physical channel is a msgA PUSCH
    the transmission is in a way of the following:
    1. a bit map
    a. each bit can be mapped to one or more of the SSBs meeting the requirement
    2. a sorted list
    the transmission of indicated SSBs in the physical channel can remove the SSB to preamble/RO mapping FIG. 7b shows a flowchart of a method 720 according to an embodiment of the present disclosure, which may be performed by an apparatus implemented in or at or communicatively coupled to a base station or any other entity having similar functionality. As such, the base station may provide means for accomplishing various parts of the method 720 as well as means for accomplishing other processes in conjunction with other components. For some parts which have been described in the above embodiments, detailed description thereof is omitted here for brevity.

At block 722, the base station receives a first message including a random access channel (RACH) preamble on a RACH occasion and data on an uplink shared channel (USCH) from a user equipment (UE). The RACH preamble or the RACH occasion indicates an SSB selected by the UE based on a mapping of the SSB to the RACH preamble and the RACH occasion. The selected SSB has a signal measured metric satisfying a criterion.

At block 724, the base station transmits a second message as a response to the first message to the UE.

In an embodiment, the data comprises information indicating at least one SSB with the signal measured metric satisfying the criterion, the method further comprises: selecting a downlink beam for transmitting the second message to the UE based on the indication in the data.

Figure 8:
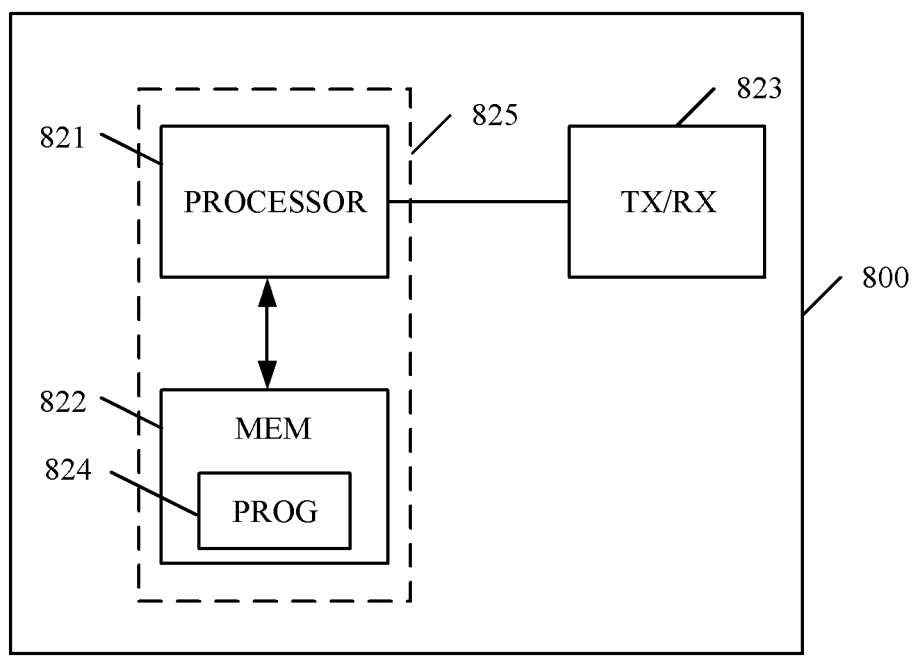
FIG. 8 is a block diagram showing an apparatus suitable for use in practicing some embodiments of the disclosure.

FIG. 8 is a block diagram showing an apparatus suitable for use in practicing some embodiments of the disclosure. For example, any one of the UE and the base station described above may be implemented through the apparatus 800.

The apparatus 800 comprises at least one processor 821, such as a DP, and at least one MEM 822 coupled to the processor 821. The apparatus 820 may further comprise a transmitter TX and receiver RX 823 coupled to the processor 821. The MEM 822 stores a PROG 824. The PROG 824 may include instructions that, when executed on the associated processor 821, enable the apparatus 820 to operate in accordance with the embodiments of the present disclosure. A combination of the at least one processor 821 and the at least one MEM 822 may form processing means 825 adapted to implement various embodiments of the present disclosure.

Various embodiments of the present disclosure may be implemented by computer program executable by one or more of the processor 821, software, firmware, hardware or in a combination thereof.

The MEM 822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 821 may be of any type suitable to the local technical environment, and may include one or more of general purpose computers, special purpose computers, microprocessors, digital signal processors DSPs and processors based on multicore processor architecture, as non-limiting examples.

Figure 9:
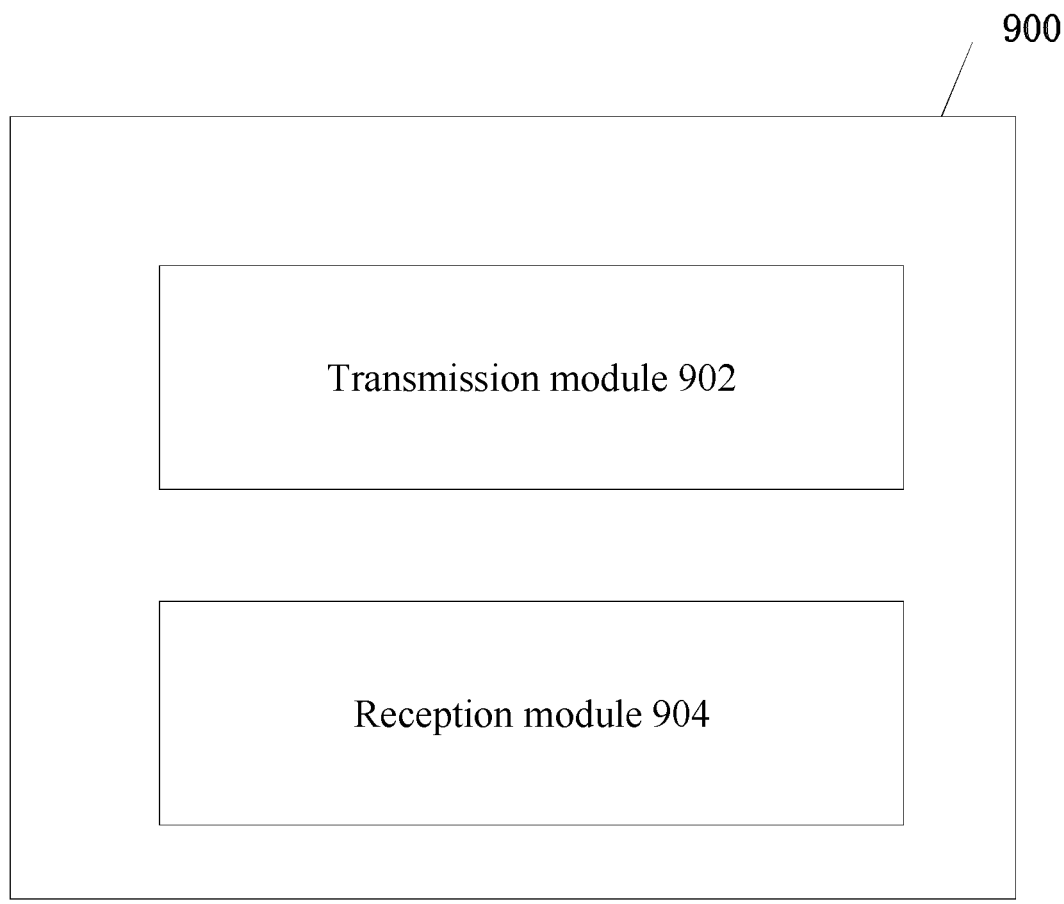
FIG. 9 illustrates a simplified block diagram of apparatus according to an embodiment of the present disclosure.

FIG. 9 is a block diagram showing a UE according to an embodiment of the disclosure. As shown, the UE 900 comprises a transmission module 902 and a reception module 904. The transmission module 902 may be configured to transmit a first message including a random access channel (RACH) preamble on a RACH occasion and data on an uplink shared channel (USCH) to a base station, wherein the data includes information of at least one synchronization signal and physical broadcast channel block (SSB) with a signal measured metric satisfying a criterion, as described above with respect to block 302 of FIG. 3a. The reception module 904 may be configured to receive a second message as a response to the first message, as described above with respect to block 304 of FIG. 3a.

Figure 10:
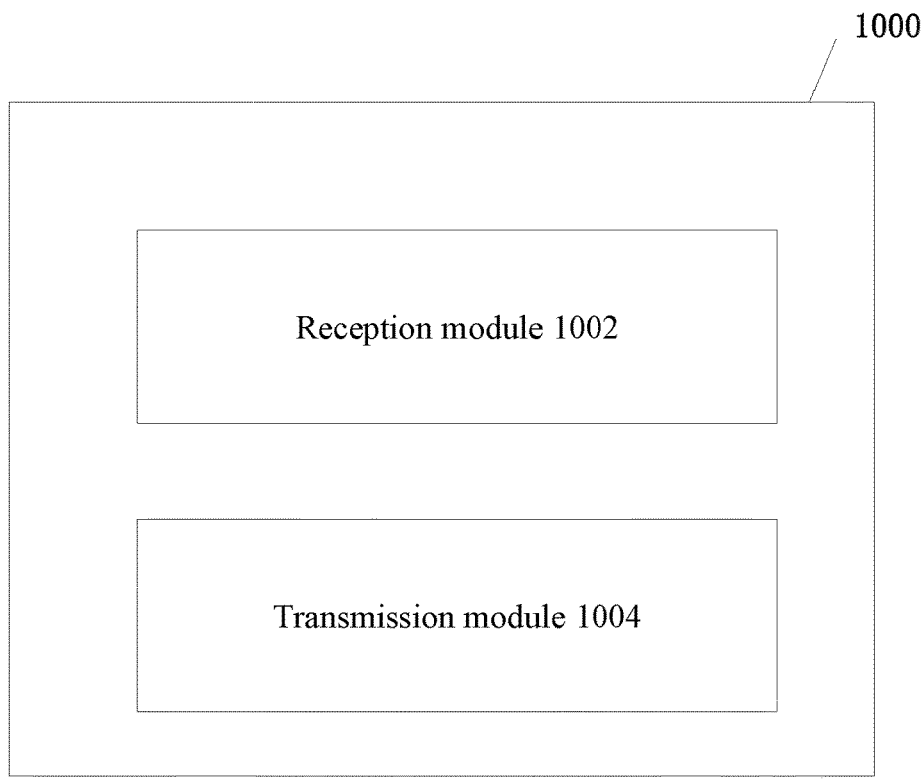
FIG. 10 illustrates a simplified block diagram of apparatus according to an embodiment of the present disclosure.

FIG. 10 is a block diagram showing a base station according to an embodiment of the disclosure. As shown, the base station 1000 comprises a reception module 1002 and a transmission module 1004. The reception module 1002 may be configured to a first message including a random access channel (RACH) preamble on a RACH occasion and data on an uplink shared channel (USCH) from a user equipment (UE), wherein the data includes information of at least one synchronization signal and physical broadcast channel block (SSB) with a signal measured metric satisfying a criterion, as described above with respect to block 402 of FIG. 4. The transmission module 1004 may be configured to transmit a second message as a response to the first message, as described above with respect to 404 of FIG. 4.

Figure 11:
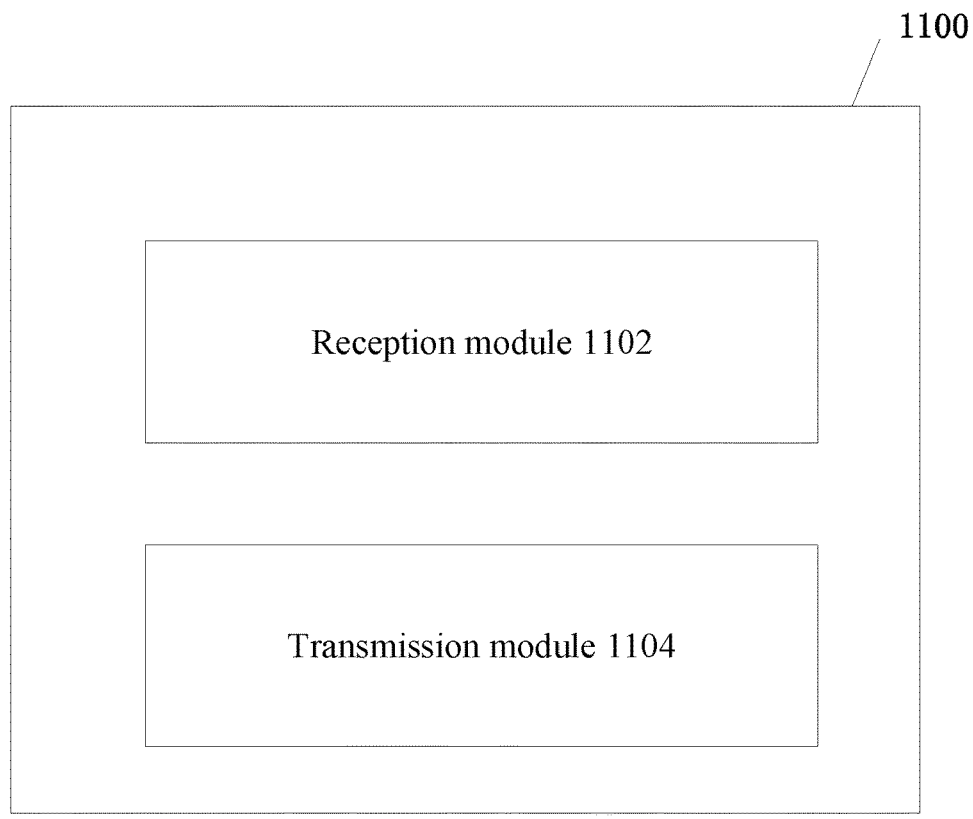
FIG. 11 illustrates a simplified block diagram of apparatus according to another embodiment of the present disclosure.

FIG. 11 is a block diagram showing a base station according to an embodiment of the disclosure. As shown, the base station 1100 comprises a reception module 1002 and a transmission module 1104. The reception module 1102 may be configured to a first message including a random access channel (RACH) preamble on a RACH occasion and data on an uplink shared channel (USCH) from a user equipment (UE), as described above with respect to block 502 of FIG. 5. The transmission module 1104 may be configured to transmit a second message as respective response to respective first message of the UE and at least one other UE, as described above with respect to 504 of FIG. 5. In an embodiment, the based station may determine a beam for the second message as one of a common downlink beam of the UE and the at least one other UE; a beam covering at least one of the UE's preferred beam and the at least one other UE's preferred beam; a preferred beam of a UE with a higher priority between the UE and the at least one other UE; and a beam randomly selected from the UE's preferred beam and the at least one other UE's preferred beam.

Figure 12:
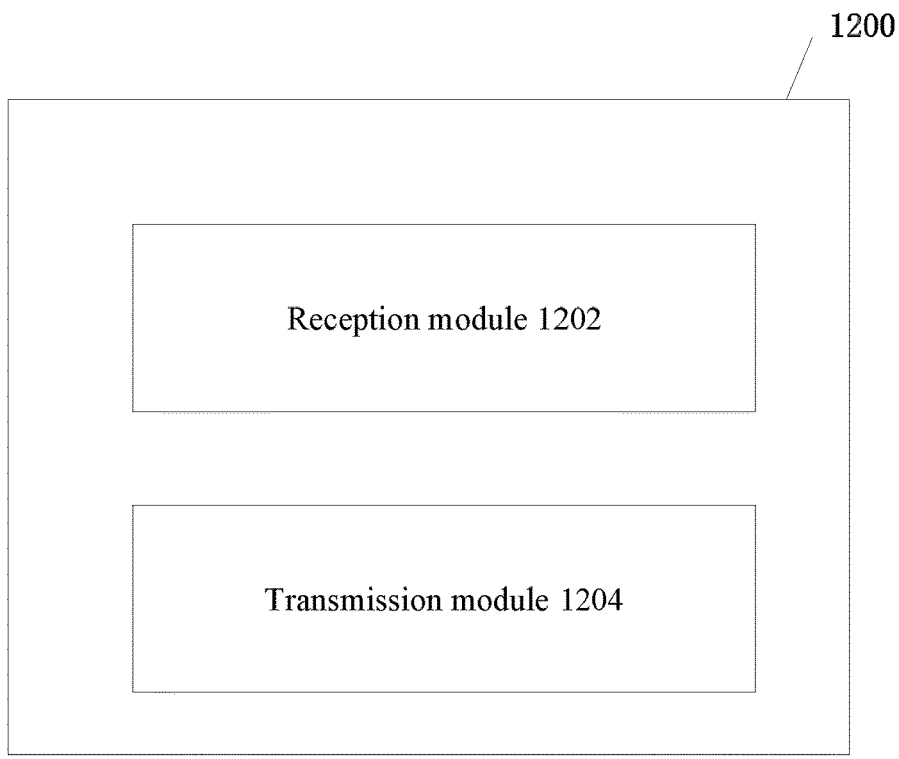
FIG. 12 illustrates a simplified block diagram of apparatus according to another embodiment of the present disclosure.

FIG. 12 is a block diagram showing a base station according to an embodiment of the disclosure. As shown, the base station 1200 comprises a reception module 1202 and a transmission module 1204. The reception module 1202 may be configured to a first message including a random access channel (RACH) preamble on a RACH occasion and data on an uplink shared channel (USCH) from a user equipment (UE), as described above with respect to block 602 of FIG. 6. The transmission module 1204 may be configured to transmit a second message as respective response to respective first message of the UE and at least one other UE, as described above with respect to 604 of FIG. 6. In an embodiment, the based station may determine a radio network temporary identifier (RNTI) for the second message as one of a common RNTI of the UE and the at least one other UE; a UE specific RNTI of a UE with a higher priority between the UE and the at least one other UE; a UE specific RNTI randomly selected from the UE's UE specific RNTI and the at least one other UE's UE specific RNTI; and a UE specific RNTI determined based on a measurement on uplink signals from the UE and the at least one other UE or a measurement by the UE and the at least one other UE on downlink signals.

Figure 13A:
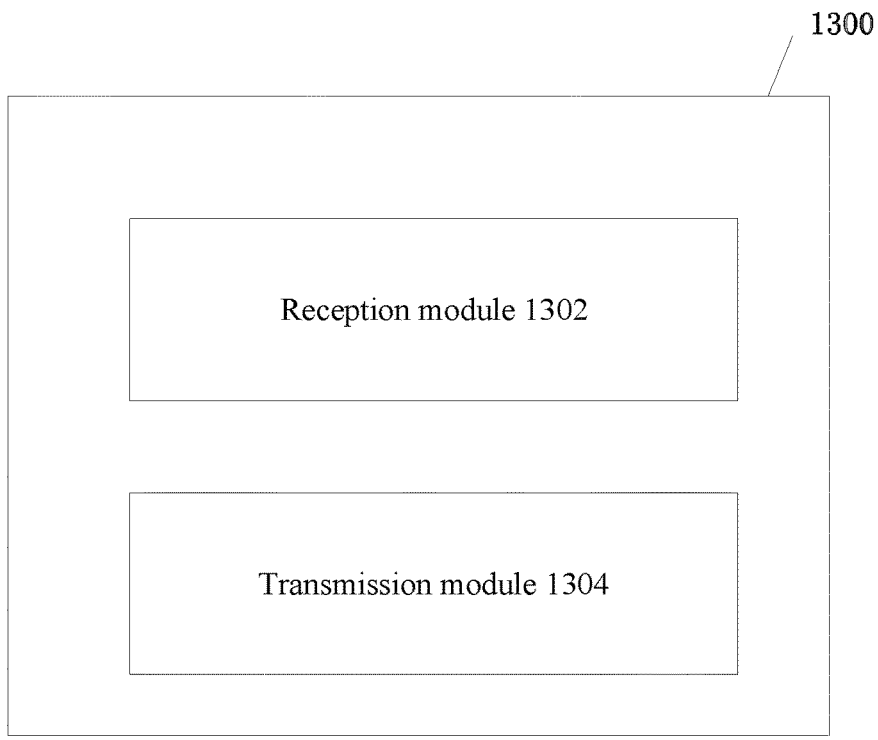
FIG. 13a illustrates a simplified block diagram of apparatus according to another embodiment of the present disclosure.

FIG. 13a is a block diagram showing a base station according to an embodiment of the disclosure. As shown, the base station 1300 comprises a reception module 1302 and a transmission module 1304. The reception module 1302 may be configured to a first message including a random access channel (RACH) preamble on a RACH occasion and data on an uplink shared channel (USCH) from a user equipment (UE), as described above with respect to block 702 of FIG. 7a. The transmission module 1304 may be configured to transmit a second message as respective response to respective first message of the UE and at least one other UE, as described above with respect to 704 of FIG. 7a. In an embodiment, the based station may determine a modulation coding scheme (MCS) for the second message as one of MCS corresponding to a lowest signal/link quality between the UE's signal/link quality and the at least one other UE's signal/link quality; MCS corresponding to a signal/link quality of a UE with a higher priority between the UE and the at least one other UE; and MCS with the lowest coding rate and/or the lowest modulation order selected from a group of MCSs determined for the UE and the at least one other UE.

Figure 13B:
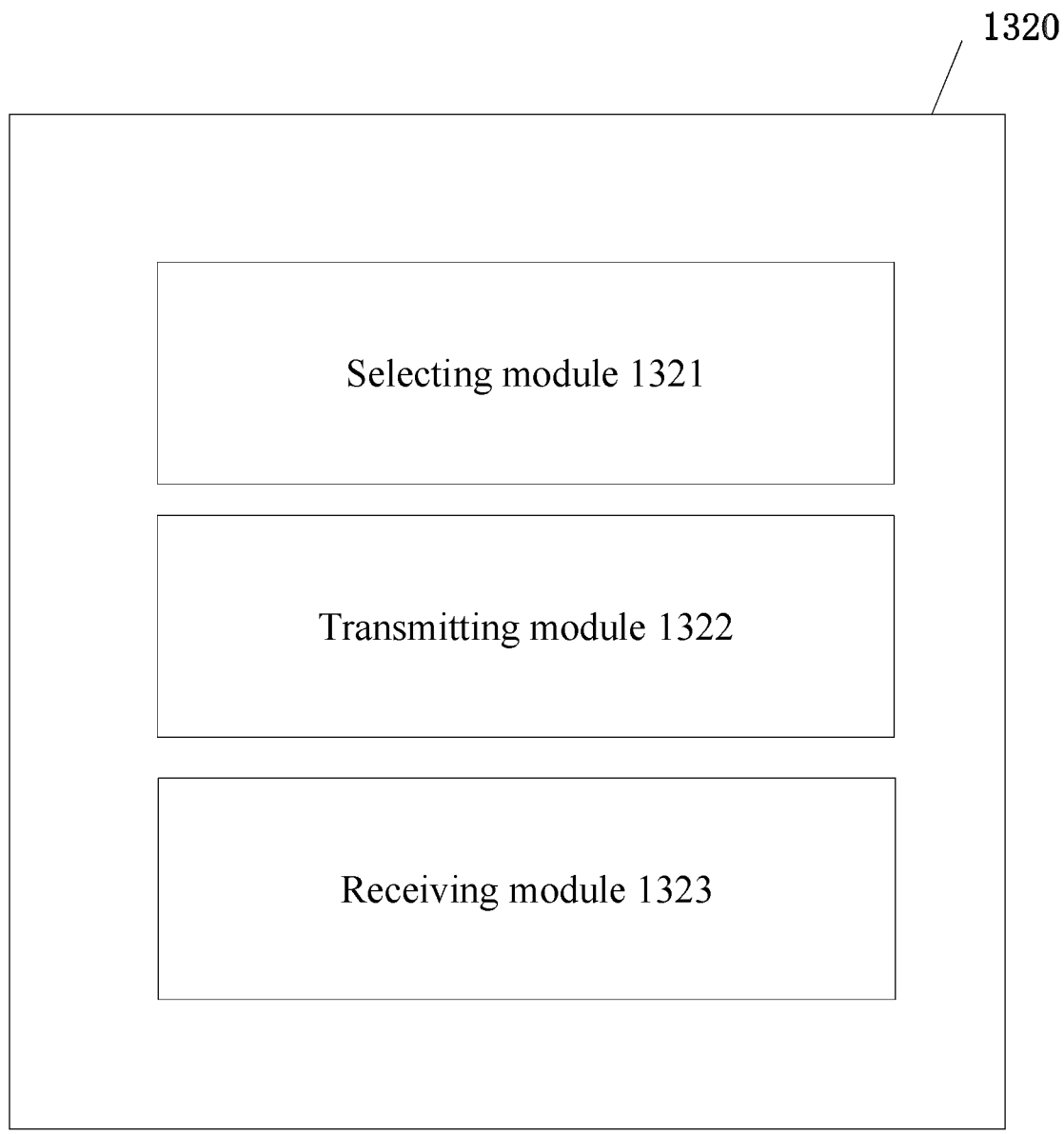
FIG. 13b is a block diagram showing a user equipment (UE) according to another embodiment of the present disclosure.
Figure 13C:
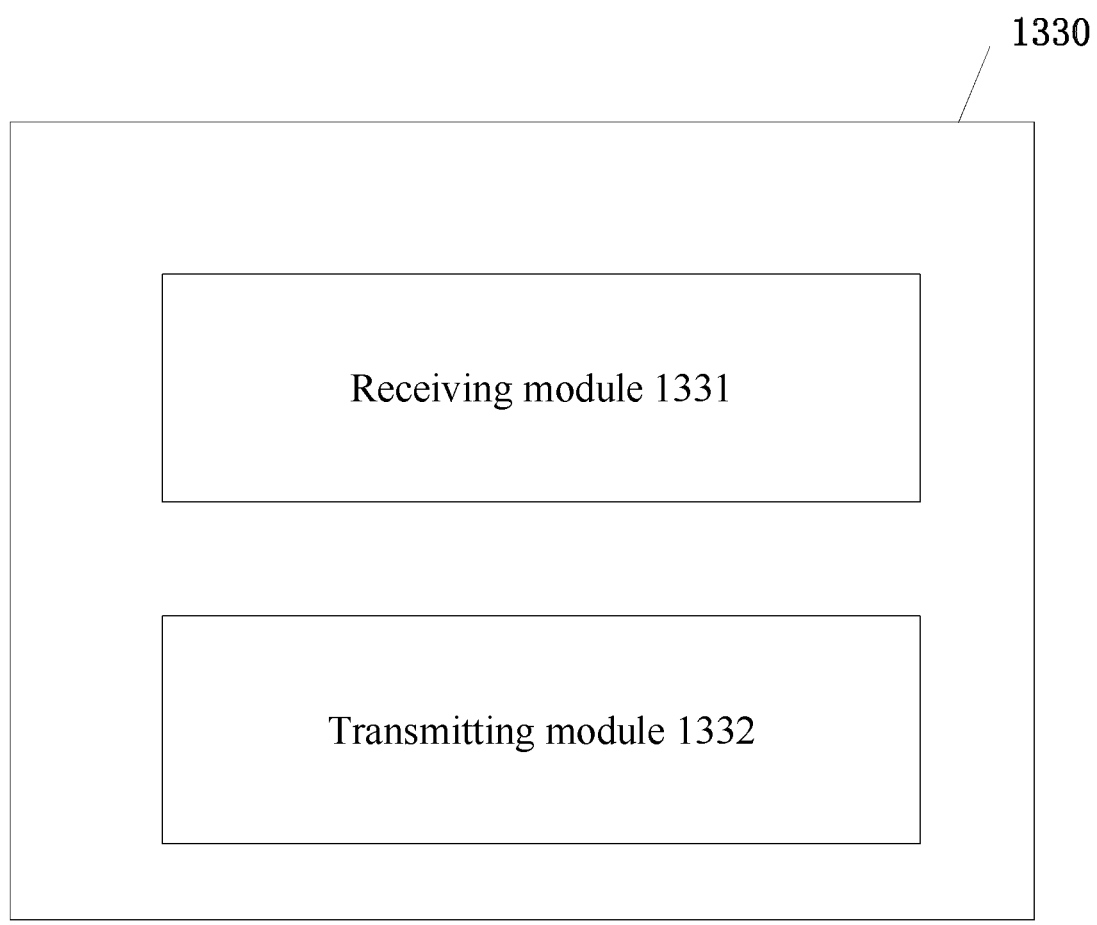
FIG. 13c is a block diagram showing a base station according to another embodiment of the present disclosure.

FIG. 13b is a block diagram showing a user equipment (UE) according to another embodiment of the present disclosure. The UE 1320 comprises a selecting module 1321, a transmitting module 1322 and a receiving module 1323. The selecting module 1321 is configured to select a synchronization signal and physical broadcast channel block (SSB) with a signal measured metric satisfying a criterion. The transmitting module 1322 is configured to transmit a first message including a random access channel (RACH) preamble on a RACH occasion and data on an uplink shared channel (USCH) to a base station. The RACH preamble and the RACH occasion are selected based on a mapping of the SSB to the RACH preamble and the RACH occasion. The receiving module 1323 is configured to receive a second message from the base station as a response to the first message FIG. 13c is a block diagram showing a base station according to another embodiment of the present disclosure. The base station 1330 comprises a receiving module 1331 and a transmitting module 1332. The receiving module 1331 is configured to receive a first message including a random access channel (RACH) preamble on a RACH occasion and data on an uplink shared channel (USCH) from a user equipment (UE). The RACH preamble or the RACH occasion indicates an SSB selected by the UE based on a mapping of the SSB to the RACH preamble and the RACH occasion. The selected SSB has a signal measured metric satisfying a criterion. The a transmitting module 1332 is configured to transmit a second message as a response to the first message to the UE.

Figure 14:
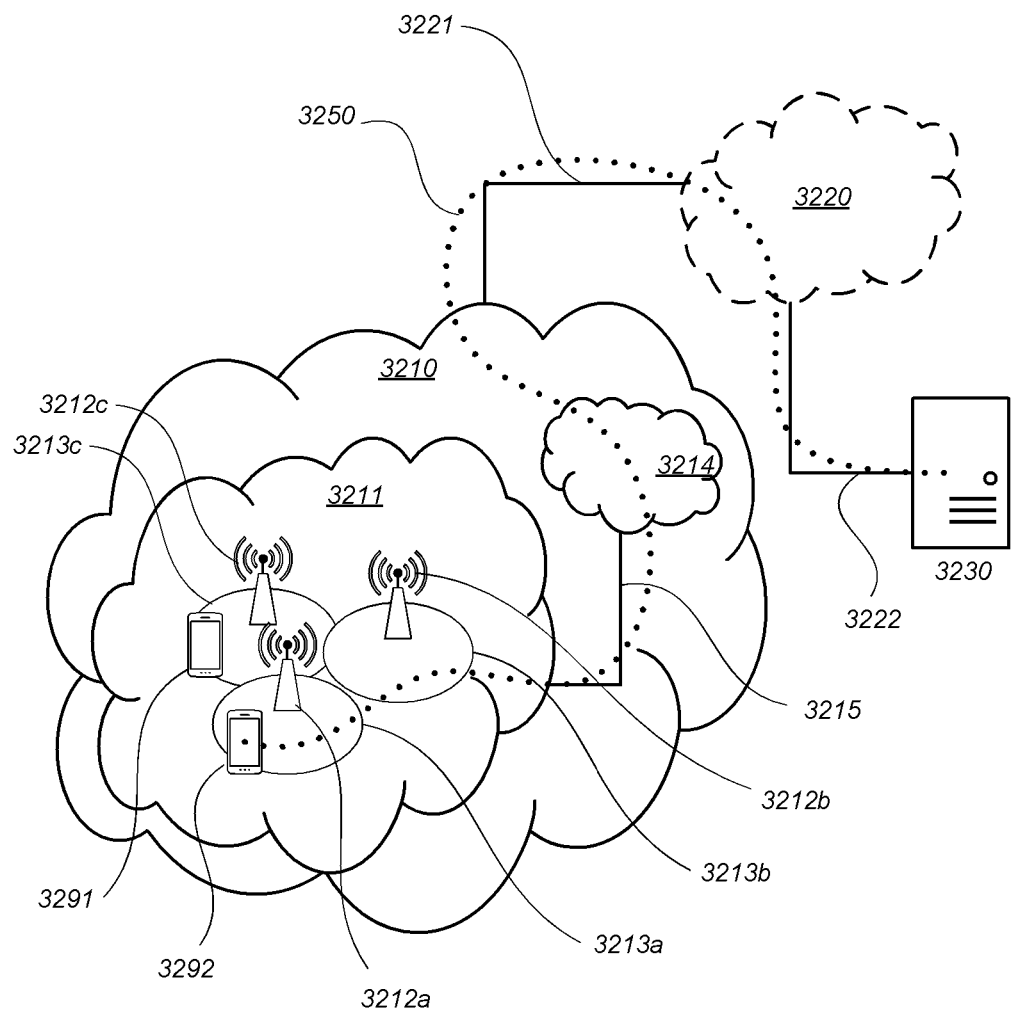
FIG. 14 is a diagram showing a telecommunication network connected via an intermediate network to a host computer in accordance with some embodiments.

With reference to FIG. 14, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 14 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 15) served by base station 3320. Communication interface 3326 may be configured to facilitate connection 3360 to host computer 3310. Connection 3360 may be direct or it may pass through a core network (not shown in FIG. 15) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 15:
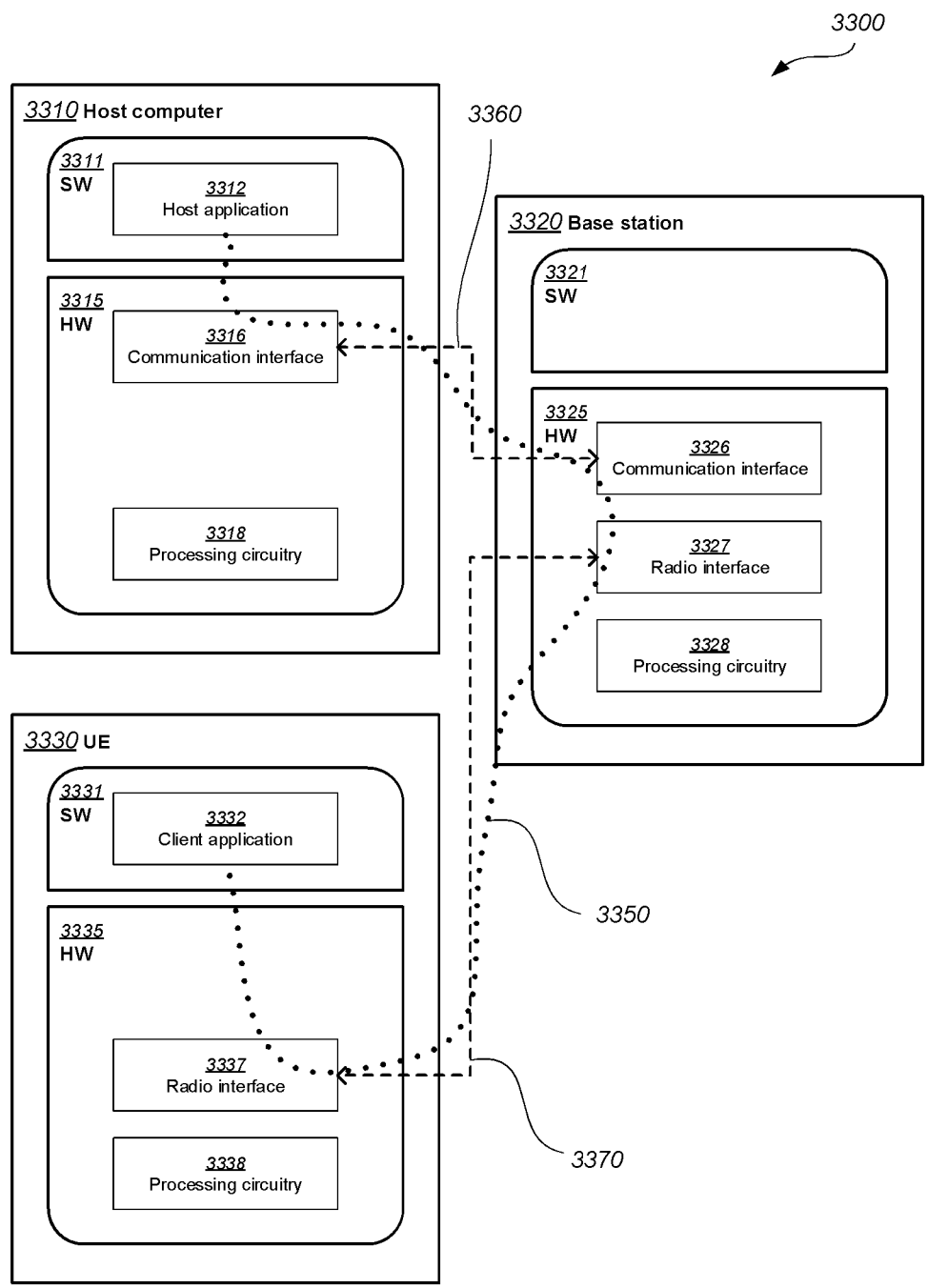
FIG. 15 is a diagram showing a host computer communicating via a base station with a user equipment in accordance with some embodiments.

It is noted that host computer 3310, base station 3320 and UE 3330 illustrated in FIG. 15 may be similar or identical to host computer 3230, one of base stations 3212a, 3212b, 3212c and one of UEs 3291, 3292 of FIG. 14, respectively. This is to say, the inner workings of these entities may be as shown in FIG. 15 and independently, the surrounding network topology may be that of FIG. 14.

In FIG. 15, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 16:
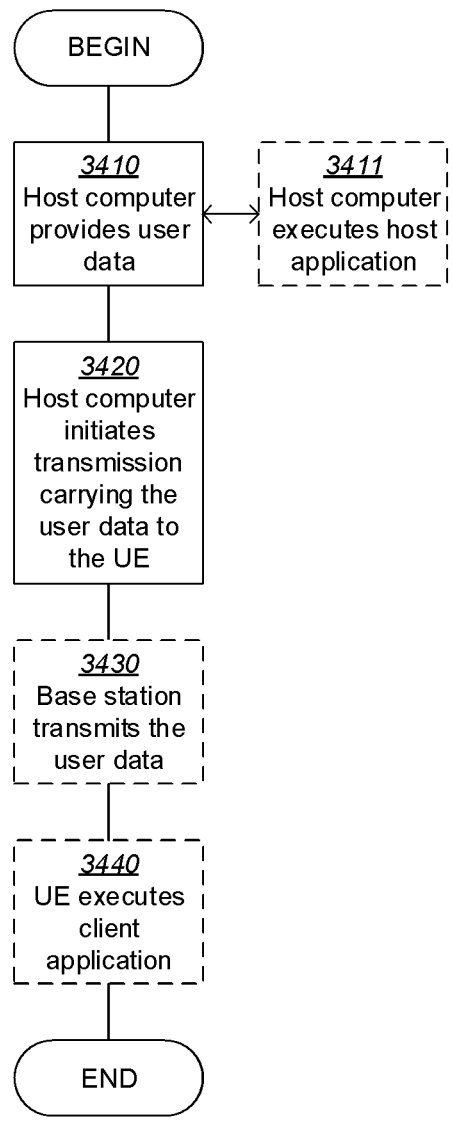
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 17:
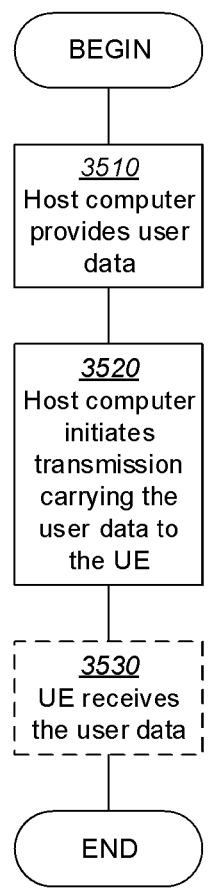
FIG. 17 is a flowchart illustrating a methods implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 18:
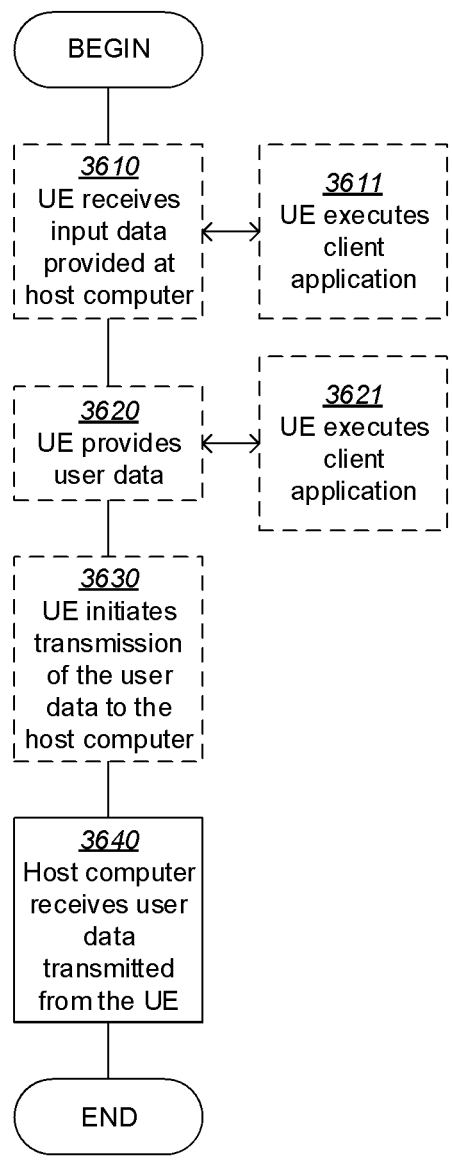
FIG. 18 is a flowchart illustrating a method implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 19:
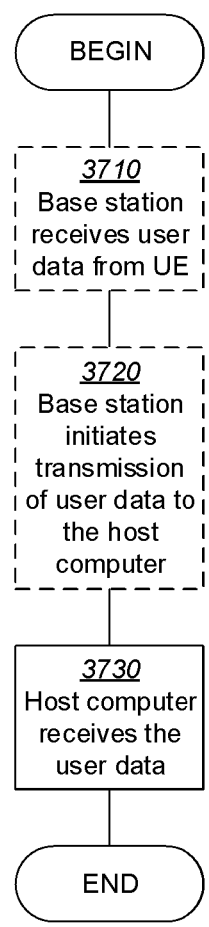
FIG. 19 is a flowchart illustrating a method implemented in a communication system in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Many advantages may be achieved by applying the proposed solution according to embodiments of the present disclosure. For example, some embodiments provide a new method for indication of SSB by the UE. Some embodiments provide a new method for determine the beam to be used for the combined msgB transmission. Some embodiments provide a new method for determine the RNTI to be used for the combined msgB transmission/monitoring. Some embodiments provide a new method for determine the MCS to be used for the combined msgB transmission.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a user equipment (UE), comprising:
    selecting a synchronization signal and physical broadcast channel block (SSB) with a signal measured metric satisfying a criterion;
    transmitting a first message including a random access channel (RACH) preamble on a RACH occasion and data on an uplink shared channel (USCH) to a base station, wherein the RACH preamble and the RACH occasion are selected based on a mapping of the SSB to the RACH preamble and the RACH occasion; and
    receiving a second message from the base station as a response to the first message,
    wherein the second message is a multiplexed response comprising a respective response to the first message of the UE, and another response to at least one other UE,
    wherein a Radio Network Temporary Identifier (RNTI) for the second message is one of:
    a common RNTI of the UE and the at least one other UE;
    a UE-specific RNTI with a higher priority between the UE and the at least one other UE;
    a UE-specific RNTI randomly selected from UE specific RNTI of the UE and at least one other's UE's UE specific RNTI; and
    a UE-specific RNTI determined based on a measurement on uplink signals from the UE and the at least one other UE or a measurement by the UE and the at least one other UE on downlink signals.

2. The method according to claim 1, wherein the data comprises information indicating at least one SSB with the signal measured metric satisfying the criterion.

3. The method according to claim 2, wherein the at least one SSB indicated by the first message includes one or more SSBs that are associated with the RACH occasion.

4. The method according to claim 2, wherein the at least one SSB indicated by the first message includes the SSBs in a set of SSBs with the signal measured metric satisfying the criterion except the SSB indicated by the RACH preamble and the RACH occasion.

5. The method according to claim 1, wherein the at least one SSB is indicated by a list sorted by the signal measured metric or a bitmap.

6. The method according to claim 1, wherein the RACH is a physical random access channel (PRACH), the USCH is a physical uplink shared channel (PUSCH) and the signal measured metric is reference signal received power (RSRP), or reference signal received quality (RSRQ), or signal-to-interference-plus-noise ratio (SINR) measured based on a downlink signal.

7. The method according to claim 1, wherein the criterion is that the signal measured metric larger than or no less than a threshold.

8. The method according to claim 1, wherein the UE and the at least one other UE:
- have a same determined MCS are multiplexed in the second message;
- have a certain common SSB with a signal measured metric satisfying the criterion are multiplexed in the second message;
- transmit RACH preambles mapped to a same SSB are multiplexed in the second message; and/or
- have a same downlink preferred beam are multiplexed in the second message.

9. The method according to claim 1, wherein a beam for the second message is one of:
- a common downlink beam of the UE and the at least one other UE;
- a beam covering at least one of the UE's preferred beam and the at least one other UE's preferred beam;
- a preferred beam of a UE with a higher priority between the UE and the at least one other UE; and
- a beam randomly selected from the UE's preferred beam and the at least one other UE's preferred beam.

10. The method according to claim 1, wherein a radio network temporary identifier (RNTI) for the second message is one of:
- a common RNTI of the UE and the at least one other UE;
- a UE-specific RNTI with a higher priority between the UE and the at least one other UE;
- a UE-specific RNTI randomly selected from the UE's UE specific RNTI and the at least one other UE's UE specific RNTI; and
- a UE-specific RNTI determined based on a measurement on uplink signals from the UE and the at least one other UE or a measurement by the UE and the at least one other UE on downlink signals.

11. The method according to claim 10, wherein
the common RNTI is computed based on a same RACH occasion when the at least one other UE and the UE having the first message transmitted on the same RACH occasion, or
the common RNTI is a group RNTI defined for the UE and the at least one other UE; or
the common RNTI is indicated in respective first message from the UE and the at least one other UE.

12. A method at a base station, comprising:
receiving a first message including a random access channel (RACH) preamble on a RACH occasion and data on an uplink shared channel (USCH) from a user equipment (UE), wherein the RACH preamble or the RACH occasion indicates an SSB selected by the UE based on a mapping of the SSB to the RACH preamble and the RACH occasion; wherein the selected SSB has a signal measured metric satisfying a criterion; and
transmitting a second message as a response to the first message to the UE, wherein the second message is a multiplexed response comprising a respective response to the first message of the UE, and another response to at least one other UE,
wherein a Radio Network Temporary Identifier (RNTI) for the second message is one of:
a common RNTI of the UE and the at least one other UE;
a UE-specific RNTI with a higher priority between the UE and the at least one other UE;
a UE-specific RNTI randomly selected from UE specific RNTI of the UE and at least one other's UE's UE specific RNTI; and
a UE-specific RNTI determined based on a measurement on uplink signals from the UE and the at least one other UE or a measurement by the UE and the at least one other UE on downlink signals.

13. The method according to claim 12, wherein the data comprises information indicating at least one SSB with the signal measured metric satisfying the criterion, the method further comprises: selecting a downlink beam for transmitting the second message to the UE based on the indication in the data.

14. A method at a base station, comprising:
receiving a first message including a random access channel (RACH) preamble on a RACH occasion and data on an uplink shared channel (USCH) from a user equipment (UE); and
transmitting a second message as respective response to respective first message of the UE, wherein the second message is a multiplexed response comprising the respective response to the first message of the UE, and another response to at least one other UE,
wherein a radio network temporary identifier (RNTI) for the second message is one of
a common RNTI of the UE and the at least one other UE;
a UE specific RNTI of a UE with a higher priority between the UE and the at least one other UE;
a UE specific RNTI randomly selected from the UE's UE specific RNTI and the at least one other UE's UE specific RNTI; and
a UE specific RNTI determined based on a measurement on uplink signals from the UE and the at least one other UE or a measurement by the UE and the at least one other UE on downlink signals.

15. The method according to claim 14, wherein
the common RNTI is computed based on a same RACH occasion when the at least one other UE and the UE having the first message transmitted on the same RACH occasion, or
the common RNTI is a group RNTI defined for the UE and the at least one other UE; or
the common RNTI is indicated in respective first message from the UE and the at least one other UE.

16. An apparatus at a user equipment (UE), comprising:
a processor; and
a memory coupled to the processor, said memory containing instructions executable by said processor, whereby said apparatus is operative to:

select a synchronization signal and physical broadcast channel block (SSB) with a signal measured metric satisfying a criterion;

transmit a first message including a random access channel (RACH) preamble on a RACH occasion and data on an uplink shared channel (USCH) to a base station, wherein the RACH preamble and the RACH occasion are selected based on a mapping of the SSB to the RACH preamble and the RACH occasion; and receive a second message as a response to the first message from the base station, wherein the second message is a multiplexed response comprising a respective response to the first message of the UE, and another response to at least one other UE, wherein a Radio Network Temporary Identifier (RNTI) for the second message is one of:
- a common RNTI of the UE and the at least one other UE;
- a UE-specific RNTI with a higher priority between the UE and the at least one other UE;
- a UE-specific RNTI randomly selected from UE specific RNTI of the UE and at least one other's UE's UE specific RNTI; and
- a UE-specific RNTI determined based on a measurement on uplink signals from the UE and the at least one other UE or a measurement by the UE and the at least one other UE on downlink signals.

17. An apparatus at a base station, comprising:

a processor; and a memory coupled to the processor, said memory containing instructions executable by said processor, whereby said apparatus is operative to:

receive a first message including a random access channel (RACH) preamble on a RACH occasion and data on an uplink shared channel (USCH) from a user equipment (UE), wherein the RACH preamble or the RACH occasion indicates an SSB selected by the UE based on a mapping of the SSB to the RACH preamble and the RACH occasion;

wherein the selected SSB has a signal measured metric satisfying a criterion; and transmit a second message as a response to the first message to the UE, wherein the second message is a multiplexed response comprising a respective response to the first message of the UE, and another response to at least one other UE, wherein a Radio Network Temporary Identifier (RNTI) for the second message is one of:
- a common RNTI of the UE and the at least one other UE;
- a UE-specific RNTI with a higher priority between the UE and the at least one other UE;
- a UE-specific RNTI randomly selected from UE specific RNTI of the UE and at least one other's UE's UE specific RNTI; and
- a UE-specific RNTI determined based on a measurement on uplink signals from the UE and the at least one other UE or a measurement by the UE and the at least one other UE on downlink signals.

18. The apparatus according to claim 17, wherein the data comprises information indicating at least one SSB with the signal measured metric satisfying the criterion, and the apparatus is further operative to select a downlink beam for transmitting the second message to the UE based on the indication in the data.

19. An apparatus at a base station, comprising:

a processor; and a memory coupled to the processor, said memory containing instructions executable by said processor, whereby said apparatus is operative to:

receive a first message including a random access channel (RACH) preamble on a RACH occasion and data on an uplink shared channel (USCH) from a user equipment (UE); and transmit a second message as respective response to respective first message of the UE, wherein the second message is a multiplexed response comprising the respective response to the first message of the UE, and another response to at least one other UE, wherein a radio network temporary identifier (RNTI) for the second message is one of a common RNTI of the UE and the at least one other UE;

a UE specific RNTI of a UE with a higher priority between the UE and the at least one other UE;

a UE specific RNTI randomly selected from the UE's UE specific RNTI and the at least one other UE's UE specific RNTI; and a UE specific RNTI determined based on a measurement on uplink signals from the UE and the at least one other UE or a measurement by the UE and the at least one other UE on downlink signals.

* * * * *